United States Patent
Fujita et al.

(10) Patent No.: US 10,654,377 B2
(45) Date of Patent: May 19, 2020

(54) POWER SEAT SLIDING DEVICE AND VEHICLE SEAT

(71) Applicant: Delta Tooling Co., Ltd., Hiroshima-shi (JP)

(72) Inventors: Etsunori Fujita, Higashihiroshima (JP); Katsuhiro Inoue, Hiroshima (JP); Kiyonori Umezaki, Hiroshima (JP)

(73) Assignee: Delta Tooling Co., Ltd., Hiroshima-shi (JP)

( * ) Notice: Subject to any disclaimer, the term of this patent is extended or adjusted under 35 U.S.C. 154(b) by 362 days.

(21) Appl. No.: 15/507,128

(22) PCT Filed: Jul. 23, 2015

(86) PCT No.: PCT/JP2015/070906
§ 371 (c)(1),
(2) Date: Feb. 27, 2017

(87) PCT Pub. No.: WO2016/031445
PCT Pub. Date: Mar. 3, 2016

(65) Prior Publication Data
US 2017/0267125 A1    Sep. 21, 2017

(30) Foreign Application Priority Data

Aug. 30, 2014  (JP) ................................. 2014-176687
Dec. 12, 2014  (JP) ................................. 2014-252524

(51) Int. Cl.
*B60N 2/02*  (2006.01)
*B60N 2/06*  (2006.01)
*F16H 25/20*  (2006.01)

(52) U.S. Cl.
CPC ............. *B60N 2/0232* (2013.01); *B60N 2/06* (2013.01); *F16H 25/20* (2013.01); *B60N 2002/0236* (2013.01); *F16H 2025/2053* (2013.01)

(58) Field of Classification Search
CPC ........ B60N 2/06; B60N 2/067; B60N 2/0887; B60N 2/0232; B60N 2002/0236; F16H 25/20; F16H 25/2021; F16H 2025/2053
(Continued)

(56) References Cited

U.S. PATENT DOCUMENTS 5,487,520 A *  1/1996  Mouri ................. B60N 2/0232
                                                            248/429
5,823,499 A    10/1998  Ito et al.
(Continued)

FOREIGN PATENT DOCUMENTS

DE    103 15 576 A1    1/2004
DE    103 10 018 A1    9/2004
(Continued)

OTHER PUBLICATIONS

Extended European Search Report dated Apr. 12, 2018 in Patent Application No. 15835599.0.
(Continued)

*Primary Examiner* — Jonathan Liu
*Assistant Examiner* — Guang H Guan
(74) *Attorney, Agent, or Firm* — Oblon, McClelland, Maier & Neustadt, L.L.P.

(57) ABSTRACT

To reduce energy loss to increase power transmission efficiency, as well as to suppress unusual sound resulting from whirling vibration. A driving force transmission mechanism includes a drive unit that generates a rotation force and consists of a motor, as well as an independent rotating mechanism that is disposed between the drive unit and one (Continued)

of a pair of left and right gear mechanisms so as to be connected to the output shaft of the drive unit and has greater kinetic energy than the rotating parts of the gear mechanisms. Flexible shafts that rotate by smaller kinetic energy than any of the kinetic energy of the drive unit, the kinetic energy of the rotating mechanism, and the friction forces and damping forces of the rotating parts of the gear mechanisms connect between the drive unit and rotating mechanism, between the rotating mechanism and one gear mechanism, and between the drive unit and the other gear mechanism.

12 Claims, 32 Drawing Sheets

(58) Field of Classification Search
USPC .......................................... 248/424, 429, 430
See application file for complete search history.

(56) References Cited

U.S. PATENT DOCUMENTS

| | | | | |
|---|---|---|---|---|
| 7,070,155 B2* | 7/2006 | Garrido | ............... | B60N 2/0232 |
| | | | | 248/424 |
| 7,325,851 B2* | 2/2008 | Ito | ............... | B60N 2/067 |
| | | | | 248/429 |
| 7,472,879 B2* | 1/2009 | Weber | ............... | B60N 2/0232 |
| | | | | 248/429 |
| 7,658,429 B2* | 2/2010 | Koga | ............... | B60N 2/067 |
| | | | | 248/429 |
| 7,669,824 B2* | 3/2010 | Woehrle | ............... | B60N 2/067 |
| | | | | 248/419 |
| 7,703,347 B2* | 4/2010 | Porinsky | ............... | B60N 2/067 |
| | | | | 74/425 |
| 8,256,822 B2* | 9/2012 | Koga | ............... | B60N 2/0232 |
| | | | | 248/429 |
| 8,382,058 B2* | 2/2013 | Sovis | ............... | B60N 2/0232 |
| | | | | 248/424 |
| 8,496,219 B2* | 7/2013 | Okada | ............... | B60N 2/0228 |
| | | | | 248/424 |
| 8,925,887 B2* | 1/2015 | Veen | ............... | B60N 2/0232 |
| | | | | 248/424 |
| 8,967,582 B2* | 3/2015 | Speck | ............... | B60N 2/0722 |
| | | | | 248/424 |
| 9,056,559 B2* | 6/2015 | Thuleau | ............... | B60N 2/0232 |
| 9,315,118 B2* | 4/2016 | Tuji | ............... | B60N 2/067 |
| 9,499,073 B2* | 11/2016 | Tsuji | ............... | B60N 2/067 |
| 2006/0261625 A1 | 11/2006 | Kröner | | |
| 2017/0267125 A1* | 9/2017 | Fujita | ............... | B60N 2/06 |
| 2019/0210488 A1* | 7/2019 | Fujita | ............... | B60N 2/0232 |

FOREIGN PATENT DOCUMENTS

| | | |
|---|---|---|
| DE | 10 2005 033 817 A1 | 1/2007 |
| FR | 2 910 393 A1 | 6/2008 |
| FR | 2 928 880 A1 | 9/2009 |
| JP | 8-156656 A | 6/1996 |
| JP | 8-300985 A | 11/1996 |
| JP | 9-86236 A | 3/1997 |
| JP | 2005-30448 A | 2/2005 |
| JP | 2007-224999 A | 9/2007 |

OTHER PUBLICATIONS

International Search Report dated Oct. 13, 2015 in PCT/JP2015/070906 Filed Jul. 23, 2015.

\* cited by examiner (a)

(b)

POWER SEAT SLIDING DEVICE AND VEHICLE SEAT

TECHNICAL FIELD

The present invention relates to a power seat sliding device and a vehicle seat.

BACKGROUND ART

As disclosed in Patent Literature 1, there is a power seat sliding device for vehicle seats having the following configuration: slide screws are disposed on, for example, upper rails with brackets therebetween; nut members screwed to the slide screws are disposed on, for example, lower rails; a motor is disposed between left and right sliders; rotation transmission shafts connected to the output shaft of the motor are connected to gear mechanisms disposed on the upper rails; the rotation driving force of the motor rotates the slide screws and changes the positions in which the nut members are screwed to the slide screws; and thus, the upper rails are moved back and forth relative to the lower rails along with the slide screws. Patent Literatures 2 and 3 disclose power seat sliding devices that each use flexible shafts (each consisting of an inner shaft in which steel wires are wound in multiple tiers and an outer tube covering the inner shaft; may be called flexible shafts, elastic torque cables, etc.) as rotation transmission shafts connecting between a motor and gear mechanisms and include means that absorbs the misalignment between the output shaft of the motor and the input shafts of the gear mechanisms to favorably transmit the rotational torque.

CITATION LIST

Patent Literature

[Patent Literature 1] Japanese Unexamined Patent Application Publication No. 8-156658
[Patent Literature 2] Japanese Unexamined Patent Application Publication No. 9-86236
[Patent Literature 3] Japanese Unexamined Patent Application Publication No. 2005-30448

SUMMARY OF INVENTION

Technical Problem

All the power seat sliding devices above transmit the driving energy of the one motor to the left and right gear mechanisms through the rotation transmission shafts, such as the flexible shafts, connected to both sides of the output shaft of the motor so that slide screws and nut members rotate relatively. For this reason, the motor must have kinetic energy required to rotate the slide screws or nut members on both sides. If the force of the motor is supplemented to reduce a loss of energy from the motor, a smaller, sore lightweight motor could be used to improve energy efficiency. If flexible shafts having a predetermined length and mass as disclosed in Patent Literatures 2 and 3 are used as rotation transmission shafts, the rotational kinetic energy is increased and therefore the whirling movement is increased. Thus, gears (worms and worm wheels) forming the gear mechanisms may contact each other and thus make sounds, or the frictional heat between the gears may increase the temperatures of the gear mechanisms.

The present invention has been made in view of the foregoing. An object of the present invention is to provide a power seat sliding device that is able to reduce the energy loss compared to a conventional power seat sliding device increase the force transmission efficiency, to maintain predetermined force transmission characteristics using a mechanism that compensates for the energy loss in an auxiliary manner, to suppress energy loss using shorter, more lightweight flexible shafts as rotation transmission shafts while achieving the suppression of an abrupt increase in the force resulting from a stop of the rotation of the motor (the drive unit), which is the original purpose of a flexible shaft, to absorb the misalignment caused by the whirling movement and thrust-direction movement of the flexible shafts themselves, and to suppress the unusual sound or temperature increase resulting from the whirling of the gears of the gear mechanisms, and a vehicle seat including the power seat sliding device.

Solution to Problem

To solve the above problem, a power seat sliding device of the present invention includes a pair of left and right sliders disposed at a predetermined distance, and including upper rails being movably disposed on lower rails and supporting a seat, a pair of left and right slide screws disposed along moving directions of the upper rails, nut members screwed to the slide screws, and a driving force transmission mechanism configured to cause one connected to the upper rail, of the slide screws and the nut members to rotate relative to the other connected to the lower rails. The driving force transmission mechanism includes a pair of left and right gear mechanisms disposed on the upper rails or the lower rails and configured to transmit a rotation force that causes the slide screws and the nut members to rotate relatively, a drive unit disposed between the pair of left and right gear mechanisms and consisting of a motor that generates a rotation force, and a rotating mechanism disposed between the drive unit and one of the pair of left and right gear mechanisms so as to be connected to an output shaft of the drive unit, the rotating mechanism having a function of compensating for an energy loss of a rotation force of the drive unit.

Preferably, the rotating mechanism has greater kinetic energy than friction forces and damping forces of rotating parts of the gear mechanisms.

Preferably, the rotating mechanism is disposed between the drive unit and one of the pair of left and right gear mechanisms so as to be connected to the output shaft of the drive unit and is set so as to have greater kinetic energy than the rotating parts of the gear mechanisms by using a mass difference between the rotating mechanism and the gear mechanisms.

Preferably, the rotating mechanism is disposed between the drive unit and one of the pair of left and right gear mechanisms so as to be connected to the output shaft of the drive unit and is set so as to have greater kinetic energy than the rotating parts of the gear mechanisms by using electrical energy different from electrical energy of the drive unit.

Preferably, flexible shafts connect between the drive unit and the rotating mechanism, between the rotating mechanism and one of the pair of left and right gear mechanisms, and between the drive unit and the other of the pair of left and right gear mechanisms, the flexible shafts being configured to rotate by smaller kinetic energy than any of kinetic energy of the drive unit, kinetic energy of the rotating mechanism, and friction forces and damping forces of rotating parts of the gear mechanisms.

Preferably, the flexible shafts are connected to the drive unit, the rotating mechanism, and the rotating parts of the gear mechanisms so as to be movable in a thrust direction.

Preferably, the rotating mechanism includes a pair of bearings disposed at a predetermined distance between the drive unit and the one gear mechanism and a rotating shaft extending between the pair of bearings and connected to the output shaft of the drive unit, the flexible shaft connecting between the drive unit and the rotating mechanism is disposed so as to connect between the drive unit and the rotating shaft, and the flexible shaft connecting between the rotating mechanism and the one gear mechanism is disposed so as to connect between the rotating shaft and the one gear mechanism.

Preferably, the rotating mechanism includes a pair of bearings disposed at a predetermined distance between the drive unit and the one gear mechanism and a rotating shaft extending between the pair of bearings and connected to an output shaft of the drive unit, and the rotating shaft is a rotating shaft whose mass is heavier than masses of gears connected to the flexible shafts in the gear mechanisms.

Preferably, the rotating shaft has a mass which is $1/10$ or more of a mass of the drive unit.

Preferably, the rotating mechanism further includes an auxiliary drive unit consisting of a motor, and the rotating shaft is connected to an output shaft of the auxiliary drive unit.

Preferably, the pair of bearings are formed of elastic members.

Preferably, a difference is made between the degrees to which the rotating shaft is press-fitted to bearing holes of the pair of bearings or a difference is made between clearances between the bearing holes and the rotating shaft, and the bearing holes cause the rotating shaft to make a whirling movement around one of the bearing holes and are able to absorb whirling of the output shaft of the drive unit.

Preferably, bearing hole of a bearing disposed close to the one gear mechanism, of the bearings has the rotating shaft press-fitted thereto, and a bearing hole of the other bearing disposed close to the drive unit is formed with an inner diameter such that a clearance between the bearing hole and an outer circumferential surface of the rotating shaft is 0 to 0.5 mm.

Preferably, the pair of bearings have bearing holes for the rotating shaft in approximately central portions thereof, both outside portions sandwiching each of the bearing holes have outside penetration holes through which reinforcing frames penetrate, and ends of each of the reinforcing frames inserted in the outside penetration holes are fixed to the pair of left and right upper rails.

Preferably, the lower rails have approximately L-shaped sections such that heights of inner walls thereof are lower than heights of outer walls thereof, and positions of centers of the rotating shaft and the reinforcing frames are lower than the heights of the outer walls.

Preferably, the upper rails each have an inner plate and an outer plate that face each other at a predetermined distance, lower-edge outward folds of the inner plate and the outer plate are formed so as to correspond to upper-edge inward folds of the lower rails, and ends of each of the reinforcing frames are fixed so as to penetrate through the inner plate and the outer plate of each of the upper rails.

Preferably, gear-mechanism brackets holding the gear mechanisms supported by the upper rails are disposed so as to be adjacent to the tabular members of the upper rails, and the reinforcing frames are disposed so as to penetrate also through the gear-mechanism brackets.

Preferably, the driving force transmission mechanism is disposed close to front portions of the upper rails, and a rear reinforcing frame extends between rear portions or the upper rails.

Preferably, the driving force transmission mechanism is disposed close to front portions of the upper rails, and upper-wall moving objects are disposed close to rear portions of the upper rails, the upper-wall moving objects protruding toward inside of the upper rails and being configured to move along upper walls located inside the lower rails and to suppress inward fall of the upper rails.

Preferably, the gear mechanisms each include a worm disposed on a lower side and a worm wheel disposed on an upper side and engaged with the worm, one end of each of the slide screws is supported by the worm wheel, the other end of the slide screw is rotatably supported by an end holding member fixed to the corresponding upper rail, and the nut members to which the slide screws are screwed and including female screw parts are fixed to the lower rails.

Preferably, regions around bearing holes having the rotating shaft inserted therein, of the pair of bearings are set as soft spring regions each having a relatively low spring constant, and regions located outside the regions and around outside penetration holes having the reinforcing frames inserted therein are set as hard spring regions each having a relatively high spring constant.

A vehicle seat of the present invention includes a seat cushion, a seat back, and any one of the above the power seat sliding devices.

Effects of Invention

According to the present invention, the driving force transmission mechanism includes the drive unit that consists of a motor for generating a rotation force, as well as the rotating mechanism that is disposed between the drive unit and one of the pair of left and right gear mechanisms so as to be connected to the output shaft of the drive unit and has the function of compensating for the energy loss of the rotation force of the drive unit, and preferably has greater kinetic energy than the rotating parts of the gear mechanisms. This rotating mechanism is able to generate approximately the same level of rotational kinetic energy as that of the drive unit consisting of a motor for generating a rotation force or the second highest level in the driving force transmission mechanism. Thus, the rotation force of the drive unit is supplemented by this rotating mechanism, thereby reducing transmission loss of energy. As a result, a smaller, more lightweight motor can be used as the drive unit.

The rotating mechanism can be formed using the rotating shaft pivoted between the pair of bearings spaced at a predetermined distance. When the rotational kinetic energy of the drive unit is transmitted to the rotating shaft, the rotating shaft is able to autonomously rotate due to the mass difference between the rotating shaft and the rotating parts (worms) of the gear mechanisms. The rotating shaft is also able to efficiently rotate since it is supported by the bearings. Further, if the auxiliary drive unit consisting of a motor is connected to the rotating shaft, it is possible to store greater kinetic energy than the rotating parts of the gear mechanisms owing to the electric energy of the auxiliary drive unit and thus to further reduce the energy loss of the drive unit. The rotating shaft preferably has a mass that is $1/10$ or more of that of the drive unit. If the rotating shaft is connected to the drive unit through the flexible shafts, it serves as a dynamic damper against vibration generated by the drive unit, thereby increasing the vibration absorption function.

If such a rotating mechanism, in addition to the drive unit, is disposed between the pair of sliders and then the flexible shafts are extended between the respective members, the length of the flexible shafts can be reduced compared to a conventional structure, where one motor alone is disposed between a pair of sliders. Conventionally, a flexible shaft having a predetermined length or more has to be used between a motor and one gear mechanism, as seen in Patent Literatures 2 and 3. In the present invention, on the other hand, the rotating mechanism having high-potential rotational kinetic energy is interposed between the members. Thus, the flexible shafts used between the drive unit and rotating mechanism and between the rotating mechanism and one gear mechanism are necessarily shortened compared to conventional flexible shafts, and the secondary inertia force resulting from misalignment is reduced accordingly. The flexible shafts disposed between the drive unit and rotating mechanism, between the rotating mechanism and one gear mechanism, and between the drive unit and the other gear mechanism are disposed so as to be movable in a direction along the rotation axis, that is, in the thrust direction with respect to the corresponding members. As seen above, the lengths of the flexible shafts used in the present invention are short, as well as more lightweight than the drive unit, rotating mechanism, and gear mechanisms and movable in the thrust direction. As a result, the kinetic energy resulting from the secondary inertia forces of the flexible shafts is smaller than the friction forces and damping forces of the rotating parts of the gear mechanisms. The misalignment between the drive unit and rotating mechanism, between the rotating mechanism and one gear mechanism, and between the drive unit and the other gear mechanism is absorbed by the whirling-involved rotational movement and thrust-direction movement or the flexible shafts having smaller kinetic energy resulting from the secondary inertia force. On the other hand, if the rotational forces of the drive unit and rotating mechanism, which generate large kinetic energy, are directly transmitted without being passed through the flexible shafts, which generate smaller kinetic energy, the gears forming the rotating parts of the gear mechanisms, for example, the worms and worm wheels would make whirling movements. These whirling movements cause contact sounds between the gears, resulting in unusual sounds. Also, a friction heat would occur due to a friction resistance caused by a twist resulting from the whirling, resulting in increases in the temperature of the gear mechanisms. According to the present invention, such unusual sounds or temperature increases can be suppressed.

BRIEF DESCRIPTION OF DRAWINGS

FIG. 32(a) is a sectional view showing a schematic configuration of the structure in which a cushion frame is mounted on the power seat sliding device of the fifth or sixth embodiment.

DESCRIPTION OF EMBODIMENTS

Figure 1:
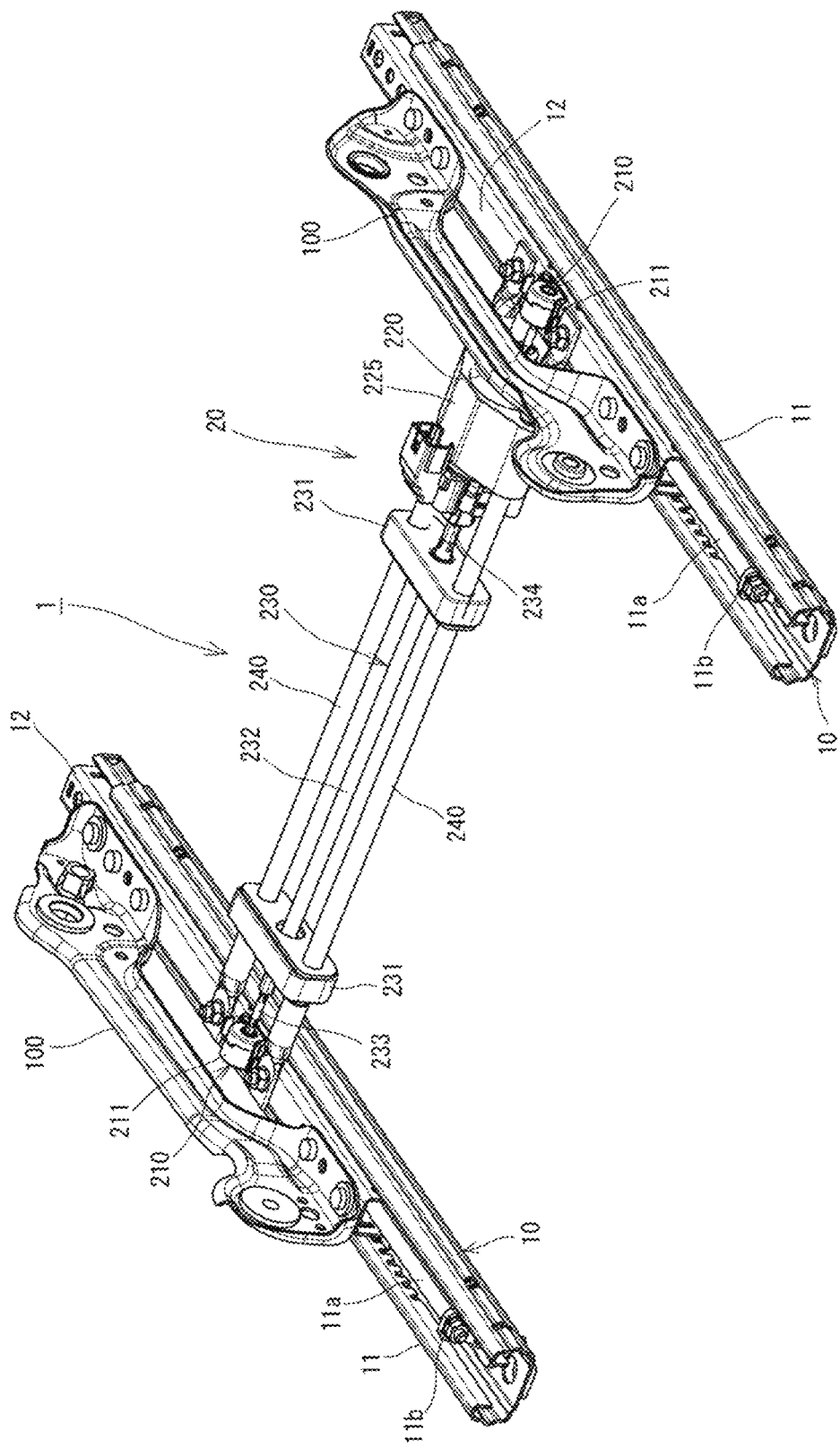
FIG. 1 is a perspective view showing a power seat sliding device 1 of a first embodiment of the present invention seen from the front.
Figure 2:
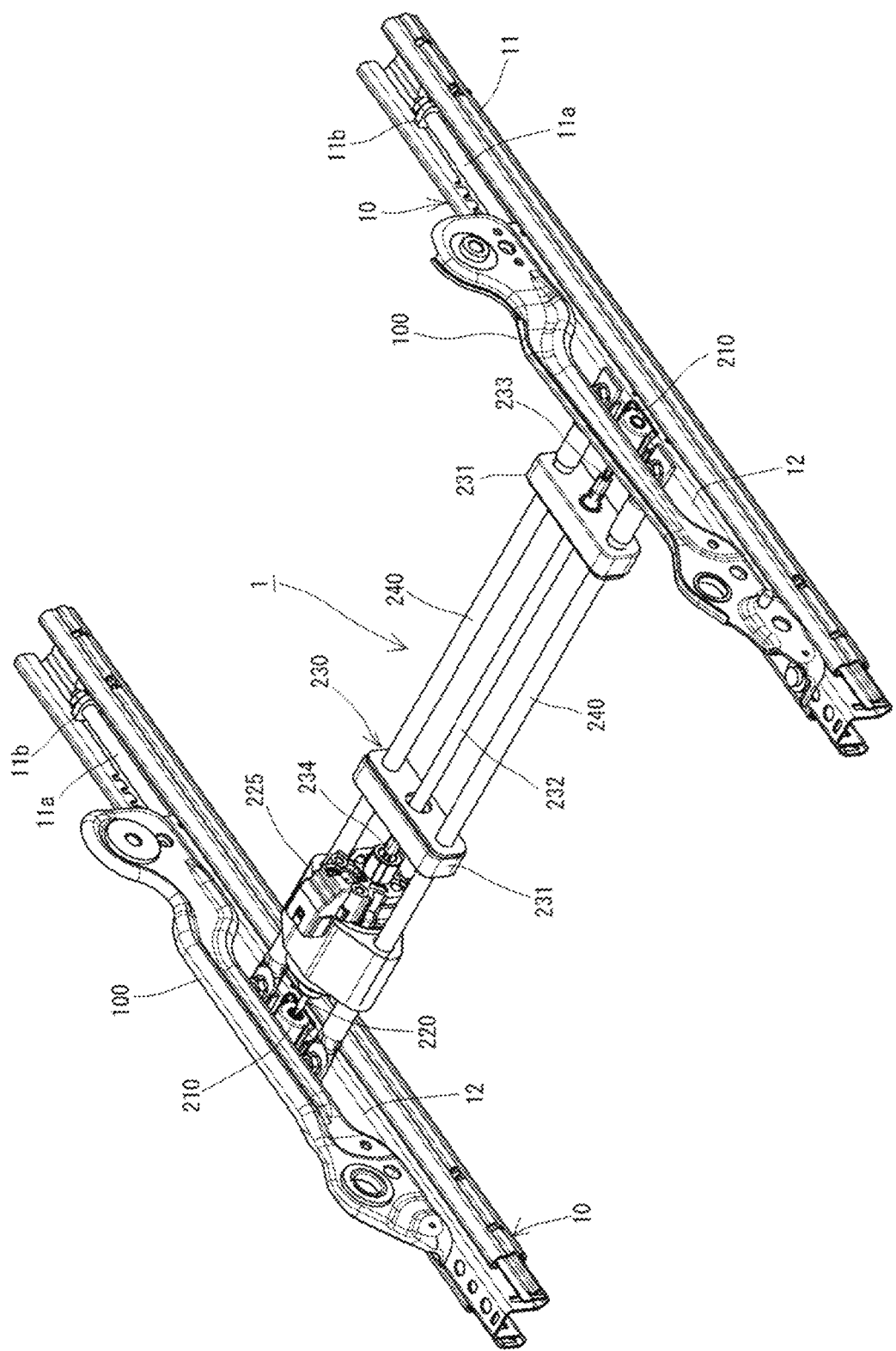
FIG. 2 is a perspective view of the power seat sliding device in FIG. 1 seen from the rear.
Figure 3:
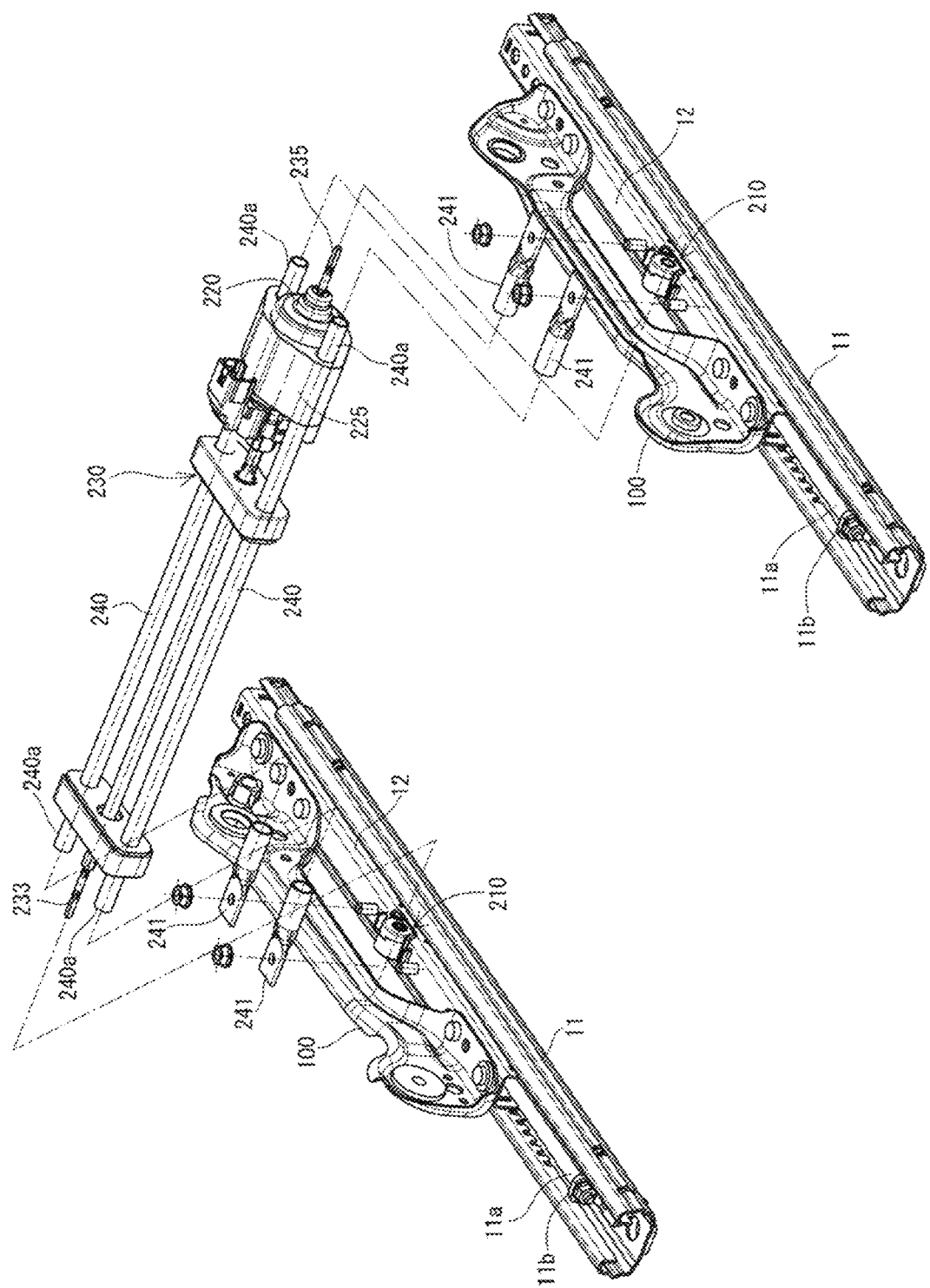
FIG. 3 is a perspective view showing a state in which a drive unit and a rotating mechanism are removed from sliders in the power seat sliding device in FIG. 1.

Now, the present invention will be described in more detail on the basis of embodiments shown in the drawings.

FIGS. 1 to 5 are drawings showing a power seat sliding device 1 of a first embodiment of the present invention. The power seat sliding device 1 includes pair of left and right sliders 10, 10 disposed at a predetermined distance in the width direction of a seat cushion, a driving force transmission mechanism 20, and others. The power seat sliding device 1 supports a cushion frame 100 of the seat cushion and is able to adjust the position of the seat cushion.

The sliders 10, 10 have a predetermined length and include lower rails 11, 11 fixed in such a manner that the length direction thereof is along the front-back direction of the seat cushion (the cushion frame 100) and upper rails 12, 12 disposed so as to be movable along the length direction of the lower rails 11, 11. The seat cushion (the cushion frame 100) is mounted on the upper rails 12, 12.

Figure 5:
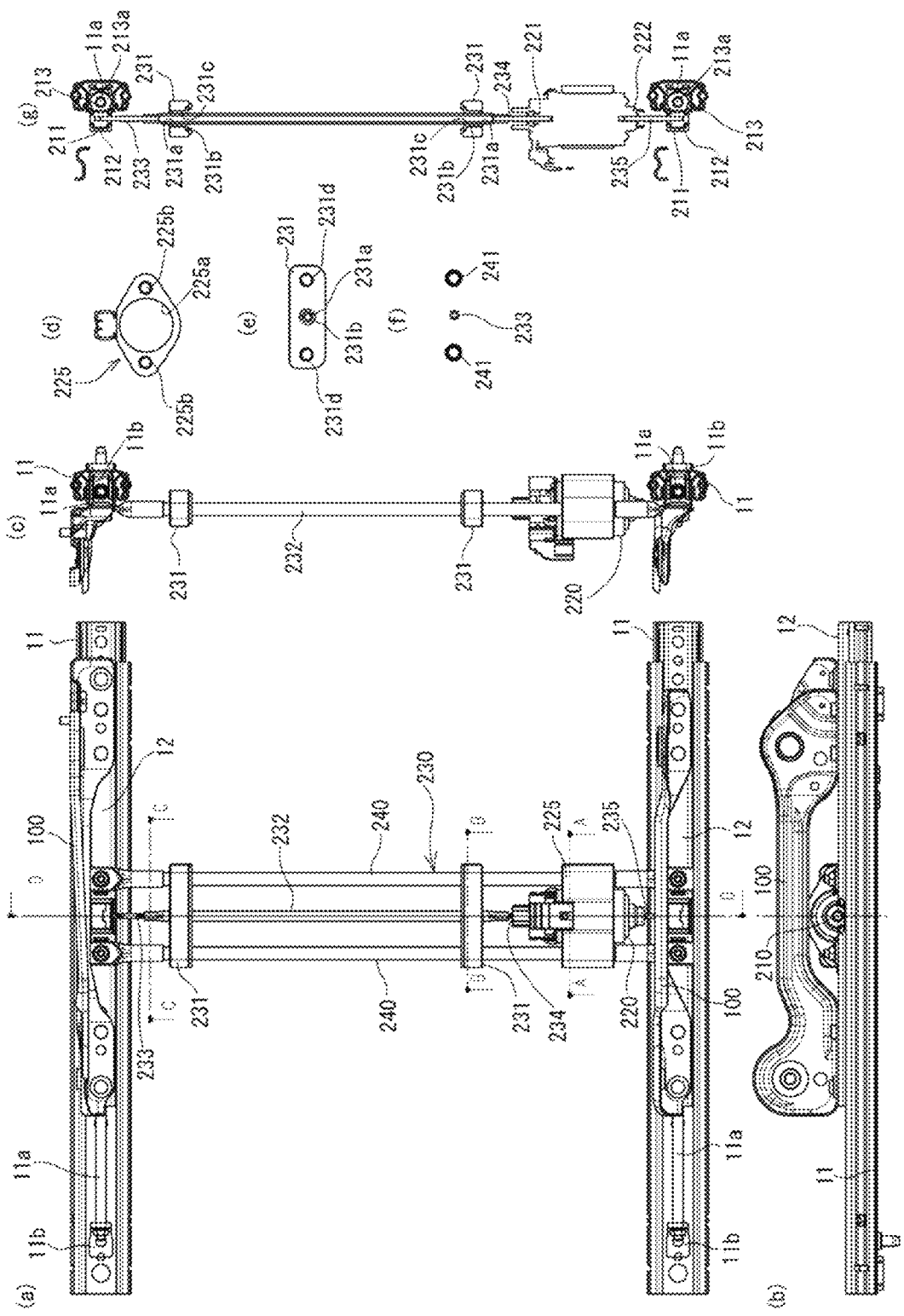
FIG. 5(a) is a plan view of the power seat sliding device in FIG. 1.
FIG. 5(b) is a side view of FIG. 5(a)
FIG. 5(c) is a rear view of FIG. 5(a)
FIG. 5(d) is a line A-A sectional view of FIG. 5(a)
FIG. 5(e) is a line B-B sectional view of FIG. 5(a)
FIG. 5(f) is a line C-C sectional view of FIG. 5(a); and FIG. (g) is a line D-D sectional view of FIG. 5(a).
Figure 6:
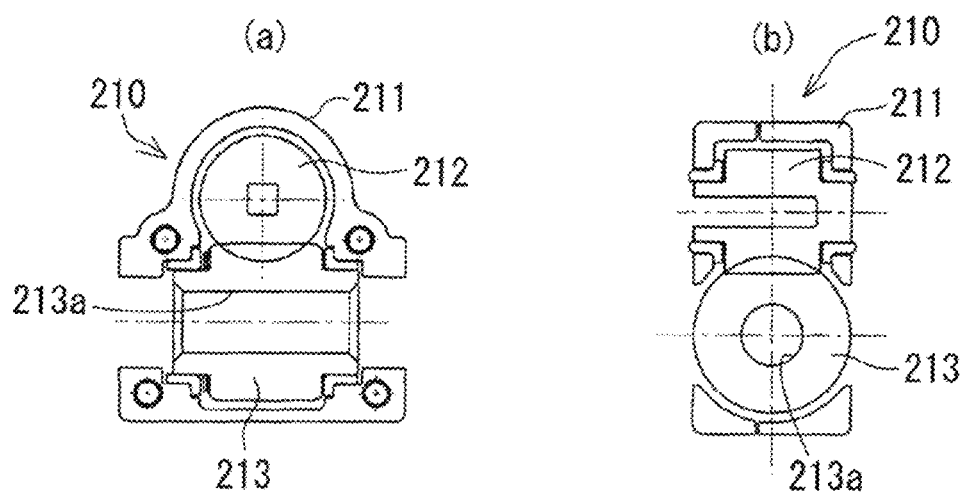
FIG. 6(a) is a longitudinal sectional view showing the structure of a gear mechanism of the power seat sliding device in FIG. 1.
FIG. 6(b) is a cross-sectional view showing the structure of the gear mechanism of the power seat sliding device in FIG. 1.
Figure 7:
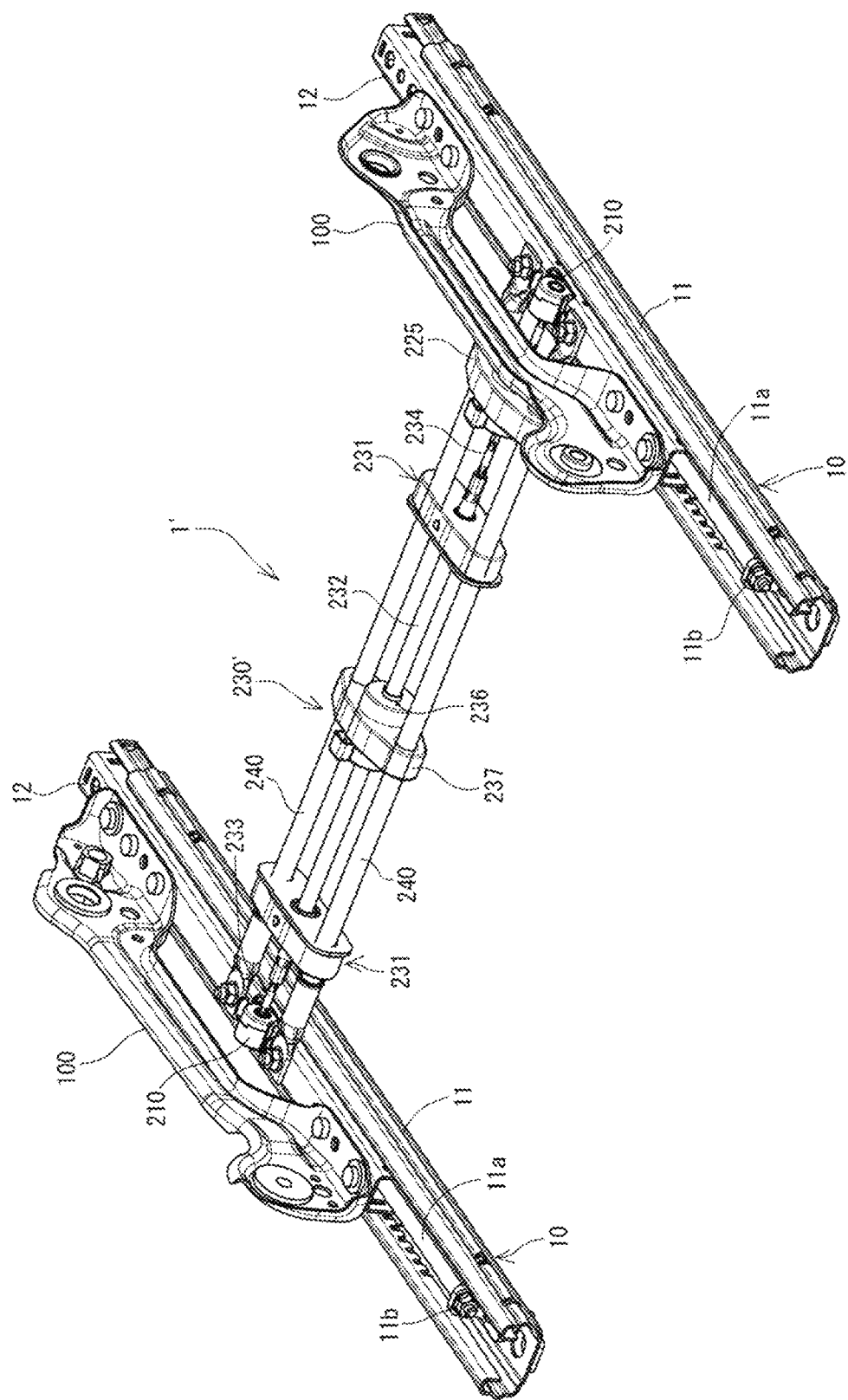
FIG. 7 is a drawing showing an experiment result relating to the vibration of the power seat sliding device during a forward movement in Experiment Example 1.
Figure 8:
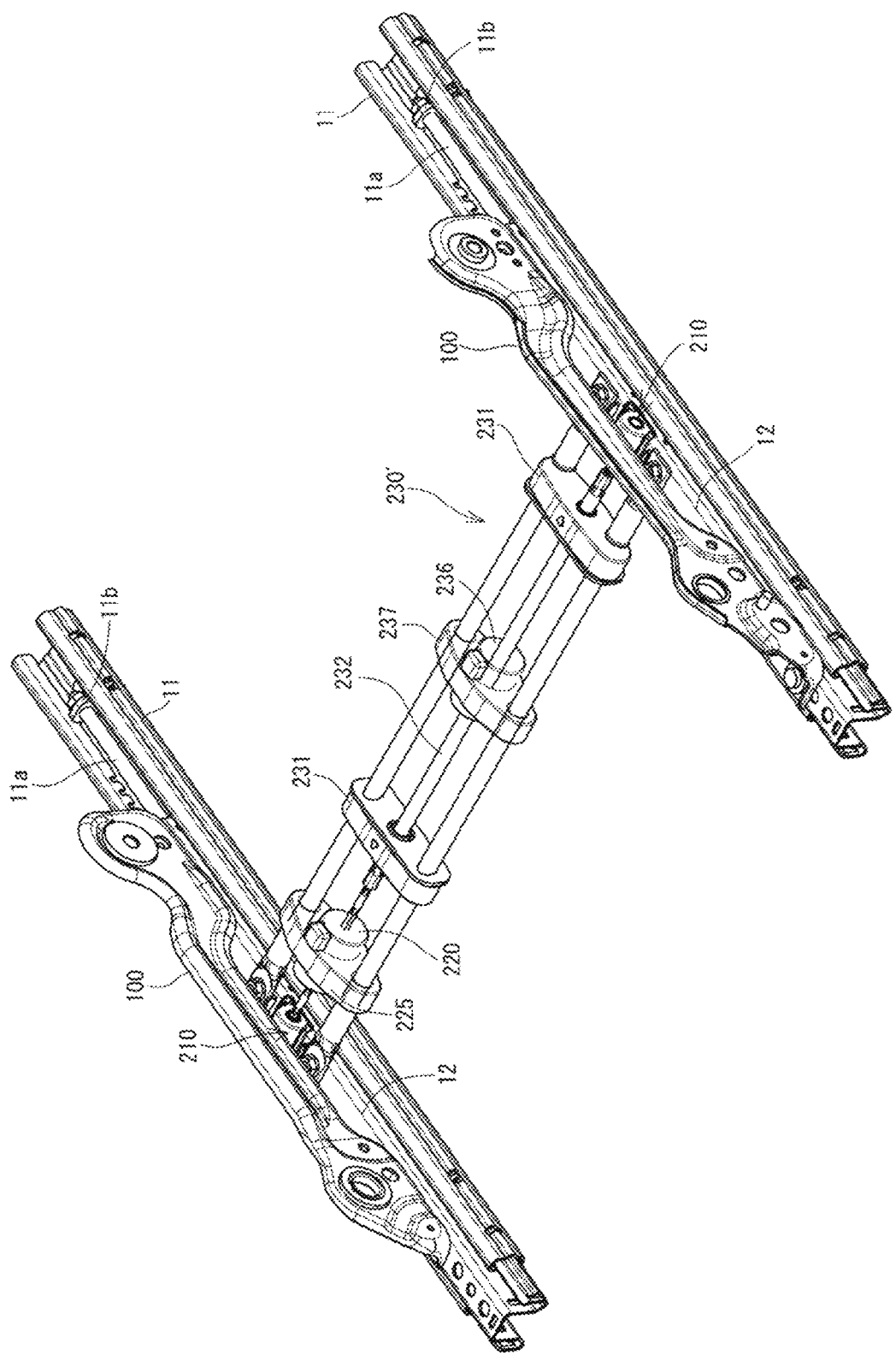
FIG. 8 is a drawing showing an experiment result relating to the vibration of the power seat sliding device during a backward movement in Experiment Example 1.
Figure 9:
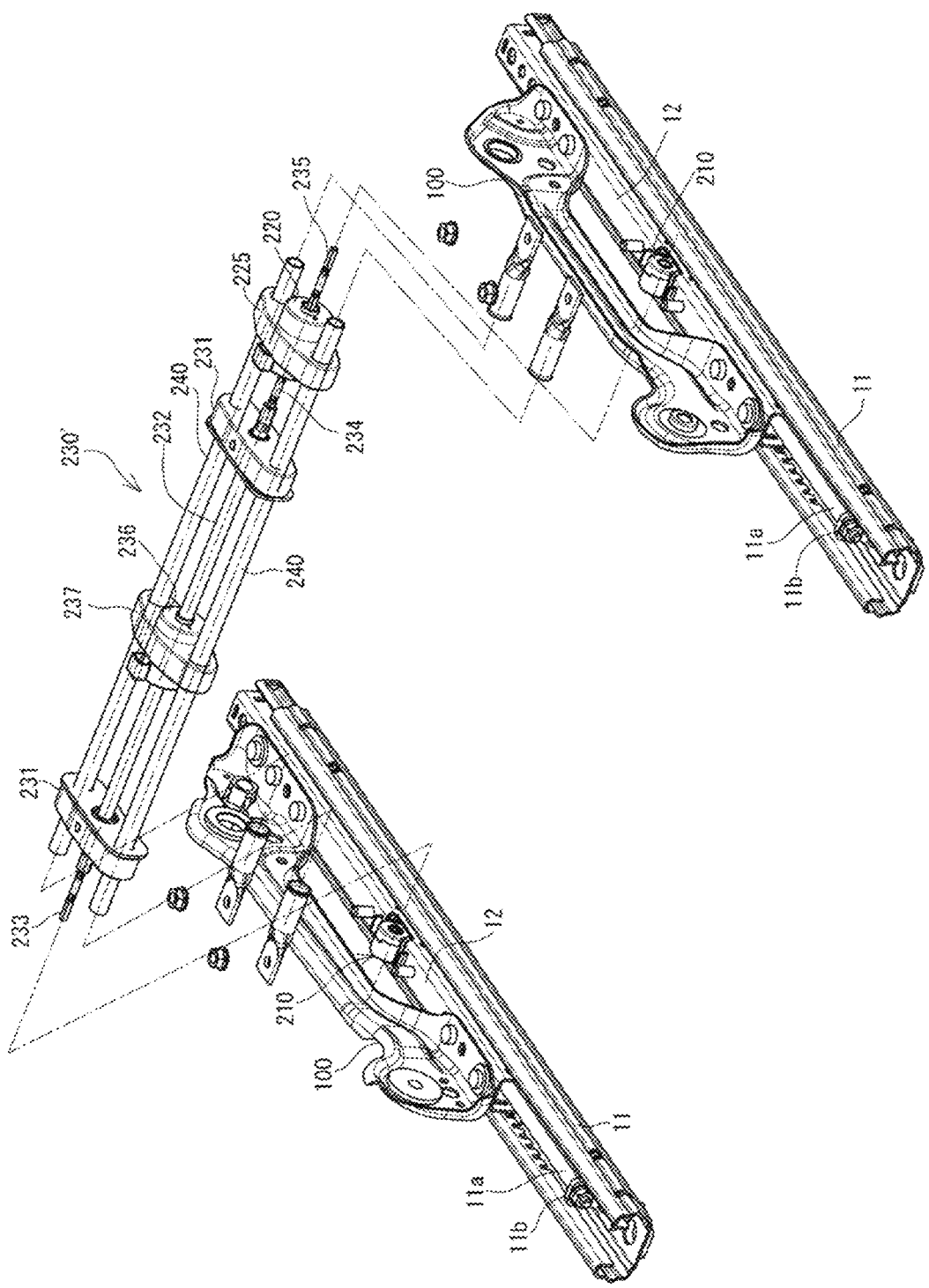
FIG. 9 is a perspective view showing a state in which a drive unit and a rotating mechanism are removed from sliders in the power seat sliding device in FIG. 7.
Figure 10:
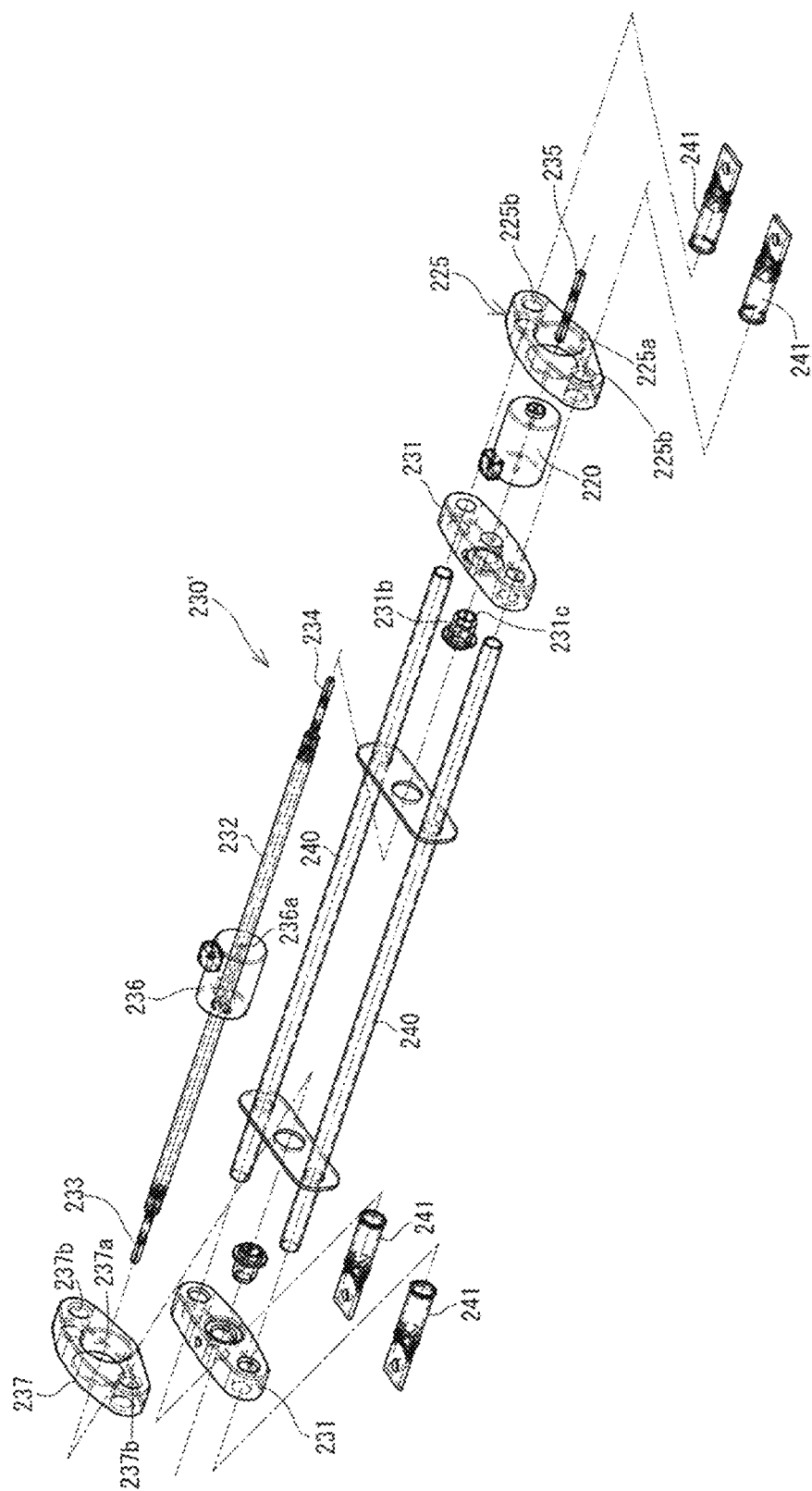
FIG. 10 is an exploded perspective view showing the structures of the drive unit and rotating mechanism in the power seat sliding device in FIG. 7.

The lower rails 11, 11 each have an approximately U-shaped section having an upper opening, and the upper rails 12, 12 are disposed inside the lower rails 11, 11. The upper rails 12, 12 each have an approximately inverted U-shaped section having a lower opening. Slide screws 11a, 11a are rotatably mounting over the lower rails 11, 11 with brackets 11b, 11b therebetween along the length direction of the lower rails 11, 11, which is the moving direction of the upper rails 12, 12. A pair of gear mechanisms 210, 210 (to be discussed later) are supported by the upper rails 12, 12. As shown in FIGS. 5(g) and 6, worm wheels 213, 213 included in the gear mechanisms 210, 210 include female screw parts 213a, 213a that penetrate along the shaft center and have, in the inner circumferential walls thereof, thread grooves screwed to slide screws 11a, 11a. The female screw parts 213a, 213a correspond to female screw parts formed in nut members screwed to the slide screws 11a, 11a. That is, in the present embodiment, the worm wheels 213, 213 included in the gear mechanisms 210, 210 serve also as nut members. Of course, the worm wheels 213, 213 included in the gear mechanisms 210, 210 and the nut members screwed to the slide screws 11a, 11a may be different members.

In the present embodiment, when the worm wheels 213, 213 corresponding to the nut members rotate relative to the slide screws 11a, 11a, the positions in which the worm wheels 213, 213 are screwed to the slide screws 11a, 11a are displaced forward or backward along the slide screws 11a, 11a. Since the gear mechanisms 210, 210 including the worm wheels 213, 213 are supported by the upper rails 12, 12, the upper rails 12, 12 also move forward or backward when the worm wheels 213, 213 are displaced forward or backward with respect to the slide screws 11a, 11a.

The driving force transmission mechanism 20 includes the pair of left and right gear mechanisms 210, 210, a drive unit 220, and a rotating mechanism 230. The pair of left and right gear mechanisms 210, 210 include cover members 211, 211 mounted on upper walls of the upper rails 12, 12, worms 212, 212 that are rotatably supported by the cover members 211, 211 and face the inside from openings formed in the upper walls of the upper rails 12, 12, and worm wheels 213, 213 that are mounted on the slide screws 12a, 12a and engaged with the worms 212, 212 (see FIGS. 5(g) and 6). As described above, the slide screws 11a, 11a are screwed to the female screw parts 213a, 213a of the worm wheels 213, 213. When the worm wheels 213, 213 are rotated by the worms 212, 212, the positions in which the worm wheels 213, 213 are screwed to the slide screws 11a, 11a are displaced.

The drive unit 220 consists of is a motor and is disposed between the pair of left and right gear mechanisms 210, 210. Note that the drive unit 220 is not disposed in the midpoint between the gear mechanisms 210, 210 but rather disposed so as to be close to any one gear mechanism 210 (in the present embodiment, the right one in FIG. 1). The reason why the drive unit 110 is disposed so as to be close to any one gear mechanism 210 is that the space around the midpoint between the sliders 10, 10 has to be reserved for leg placement or other purposes. This also applies to conventional power seat sliding devices. However, in the case of a conventional power seat sliding device, a motor serving as a drive unit has to be disposed in a position close to any one gear mechanism 210. A flexible shaft extending toward one gear mechanism is shorter, and a flexible shaft extending toward the other gear mechanism is longer. The longer flexible shaft has a higher mass than the shorter flexible shaft and changes the vibrational mode during rotation, causing a so-called "jumping-rope phenomenon." The longer flexible shaft also produces high kinetic energy when whirled. Thus, the worms 212, 212 and worm wheels 213, 213 serving as the rotating parts of the gear mechanisms 210, 210 make rotational movements (whirling movements) while vibrating in the thrust or radial direction. As a result, the worms 212, 212 and worm wheels 213 may collide with or vibrate each other, making unusual sounds or frictional heat. The frictional heat may cause a temperature increase. In the present embodiment, on the other hand, since the rotating mechanism 230 (to be discussed later) is provided, flexible shafts 233, 234, 235 which are shorter and more lightweight than a conventional flexible shaft are used between the drive unit 220 and rotating mechanism 230, between the rotating mechanism 230 and the one gear mechanism 210, and between the drive unit 220 and the other gear mechanism 210. Thus, unusual sounds or frictional heat resulting from the collision or vibration between the worms 212, 212 and worm wheels 213, 213 can be suppressed, and a temperature increase resulting from the frictional heat can also be suppressed. Details will be discussed later.

The rotating mechanism 230 is a mechanism that has approximately the same level of rotational kinetic energy as the drive unit 220 that generates a rotational force or the second highest level or rotational kinetic energy next to the drive unit 220 in the driving force transmission mechanism 20. Specifically, in order to control the rotational movement of the worms 212, 212 and worm wheels 213, 213 serving as the rotating parts of the gear mechanisms 210, 210 from outside to reduce the moment of inertia of whirling, the rotating mechanism 230 has greater rotational kinetic energy than kinetic energy generated by the rotating parts of the gear mechanisms 210, 210. The rotating mechanism 230 of the present embodiment is disposed between the drive unit 220 and one gear mechanism 210 (the left one in FIG. 1). Since the drive unit 220 is disposed so as to be close to the other gear mechanism 210 (the right one in FIG. 1), the rotating mechanism 230 is disposed in the area in which a longer flexible shaft is conventionally disposed. The rotating mechanism 230 includes a pair of bearings 231, 231 disposed at a predetermined distance and a rotating shaft 232 extending between the pair of bearings 231, 231.

Figure 4:
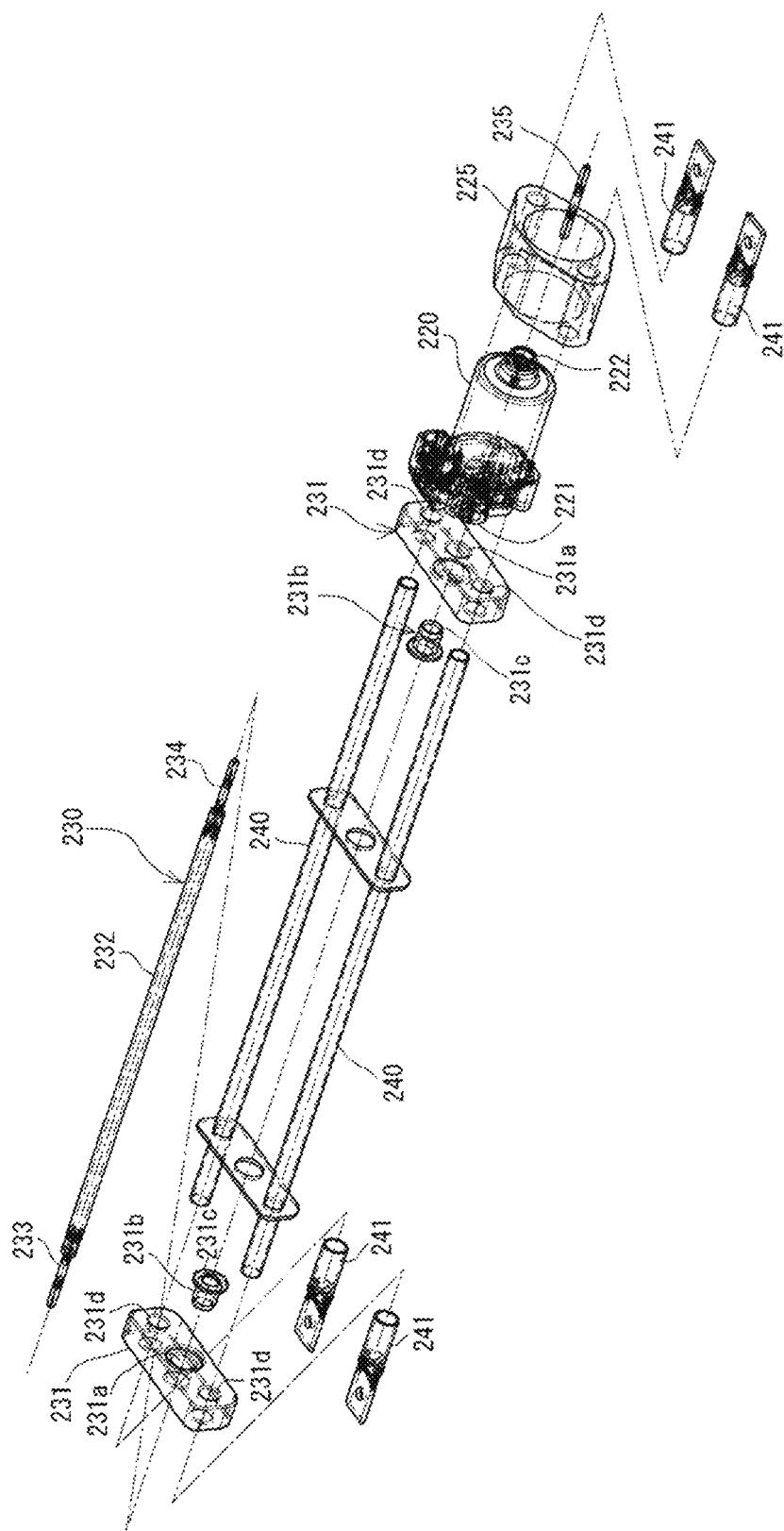
FIG. 4 is an exploded perspective view showing the structures of the drive unit and rotating mechanism in the power seat sliding device in FIG. 1.

The pair of bearings 231, 231 are formed of elastic members. The bearings 231, 231 absorb perpendicular-to-axis component forces resulting from the whirling of the first and second flexible shafts 233, 234 (to be discussed later) and secondary inertial force-based vibration received by the rotating shaft 232 from the first and second flexible shafts 233, 234. Also, the bearings 231, 231 accommodate dimensional errors of the elements thanks to the spring and damping characteristics of the elastic members and absorb the secondary inertial force-based kinetic energy of the flexible shafts 233, 234 using the rotational kinetic energy of the rotating shaft 232. In this way, the bearings 231, 231 perform the alignment function of automatically stabilizing the rotation position. While the elastic members may be rubber, synthetic resin, or the like, rubber is preferred in terms of the functions (vibration damping, automatic alignment, etc.), cost, or the like. As shown in FIGS. 4 and 5, the pair of bearings 231, 231 are in the shape of approximately rectangular parallelepipeds and have rotating-shaft penetration holes 231a, 231a approximately in the centers thereof. Inserted in the rotating-shaft penetration holes 231a, 231a are tubular bearing components 231b, 231b that have excellent wear resistance and slidability and are formed of a synthetic resin. The hollows of the bearings 231, 231 serve as bearing holes 231c, 231c. The bearings 231, 231 also have outside penetration holes 231d, 231d in outside areas sandwiching the rotating-shaft penetration holes 231a, 231a having the bearing components 231b, 231b therein. While, in the present embodiment, the bearing components 231b, 231b are inserted in the rotating-shaft penetration holes 231a, 231a and the hollows are used as the bearing holes 231c, 231c, the rotating-shaft penetration holes 231a, 231a themselves may be used as bearing holes without inserting the bearing components 231b, 231b.

The rotating shaft 232 is borne by inserting the ends of the rotating shaft 232 into the bearing holes 231c, 231c formed in the bearings 231, 231. The rotating shaft 232 is a steel pipe having a predetermined mass. Specifically, the rotating shaft 232 is a heavier steel pipe than the worms 212, 212, which are included in the gear mechanisms 210, 210 and are gears connected to the first flexible shaft 233 and third flexible shaft 235 (to be discussed later). The rotating shaft 232 is inserted in the bearing holes 231c, 231c. Thus, the rotating shaft 232 is able to rotate with a low resistance using the mass difference between the rotating shaft 232 and worms 212. When the rotating mechanism 230, which is a combination of the bearings 231, 231 and rotating shaft 232, receives a rotational force, it is able to transmit the rotational force without significantly damping it. That is, the rotating mechanism 230 of the present embodiment does not have a rotational force generation function, but once it starts to rotate by the driving force of the drive unit 220, the rotating mechanism 230 autonomously rotates using the mass difference between the rotating mechanism 230 and the worms 212, 212. As a result, the rotating mechanism 230 functions as a rotating mechanism that is substantially independent of the drive unit 220 or sliders 10, 10. Thus, it performs the function of highly efficiently rotating with respect to the motor serving as the drive unit 220 to compensate for the energy loss of the drive unit 220 and has greater rotational kinetic energy than the worms 212, 212 and worm wheels 213, 213 serving as the rotating parts of the gear mechanisms 210, 210. The rotating shaft 232 preferably has a mass that is 1/10 or more of that of the drive unit 220. As will be described later, the rotating shaft 232 is connected to an output shaft (a rotor) 221 of the drive unit 220 through the second flexible shaft 234. For this reason, the rotating shaft 232 having such an amount of mass serves as a dynamic damper against vibration that the drive unit 220 generates when driven, thereby enhancing the vibration absorption function.

Of course, the ends of the rotating shaft 232 can be inserted into one bearing 231 and the other bearing 231 in the same manner (as described above, in the present embodiment, the bearing holes 231c, 231c are the hollows of the bearing components 231b, 231b, but the rotating-shaft penetration holes 231a, 231a themselves may serve as bearing holes). However, the ends of the rotating shaft 232 are preferably inserted into one bearing 231 and the other bearing 231 in different degrees or manners. Specifically, if press-fitting is used due to the relationship between the outer diameter of the rotating shaft 232 and the inner diameter of the bearing holes 231c, 231c, press-fitting is preferably performed in different degrees. If slight clearances are formed in both the bearings 231, 231, clearances having different sizes are preferably formed in one bearing 231 and the other bearing 231. Of course, one end of the rotating shaft 232 may be inserted into one bearing hole 231c in a press-fitting manner, and the other end of the rotating shaft 232 may be inserted into the other bearing hole 231c with a slight clearance. By inserting the rotating shaft 232 into one bearing 231 and the other bearing 231 in different degrees or manners, an end opposite to an end press-fitted with a higher degree or an end with a smaller clearance, of the rotating shaft 232, that is, an end receiving a higher bearing pressure from the outer circumferential surface is more likely to make a whirling movement around the higher bearing pressure receiving end. Thus, the rotating shaft 232 easily makes a movement replacing the whirling of the output shaft 221 when the drive unit 220 is driven and thus easily performs the dynamic damper function.

Since the rotating shaft 232 is rotatably held by the bearing components 231b, 231b, the rotating shaft 232 is, of course, "press-fitted" to such a degree that the rotational force thereof is not impaired and that the rotating shaft 232 does not become wobbly when the outer circumferential surface thereof is slightly pressed.

The first flexible shaft 233 is connected to one end of the rotating shaft 232, and the second flexible shaft 234 is connected to the other end. The first flexible shaft 233 is connected to the rotation center of the worm 212 of one gear mechanism 210 (the left one in FIG. 1) so as to be movable in the thrust direction, preferably in a range of the order of 1 to 5 mm. More preferably, it is connected with a clearance of 0.5 mm or less in the radial direction. The second flexible shaft 234 is connected to the output shaft 221 located on one side of the drive unit 220 so as to be movable in the thrust direction, preferably in a range of the order of 1 to 5 mm. More preferably, it is connected with a clearance of 0.5 mm or less in the radial direction. For an output shaft (rotor) 222 located on the other side of the drive unit 220, one end thereof is connected to the third flexible shaft 235, and the other end is connected to the rotation center of the worm 212 of the other gear mechanism 210 (the right one in FIG. 1).

The rotating mechanism 230 autonomously rotates using the mass difference between the rotating mechanism 230 and worms 212, 212 and passively controls the secondary inertial force resulting from the whirling of the gear mechanisms 210, 210. On the other hand, the rotating mechanism 230 must accommodate the misalignment between the rotation axes of the rotating mechanism 230 and one worm 212, between the rotation axes of the drive unit 220 and the other worm 212, and between the rotation axes of the rotating mechanism 230 and drive unit 220 and transmit the rotational forces of the rotating mechanism 230 and drive unit 220 while reducing an influence resulting from the collision or vibration between the engaged parts of the gear mechanisms 210, 210. Also, it is necessary to absorb a shock that occurs when the rotation direction of the drive unit 220 and other members connected to the drive unit 220 to use the driving force of the drive unit 220 is switched between the CW and CCW directions and thus to prevent gear tooth chipping or the like. For these reasons, the flexible shafts 233, 234, 235 are provided. As the lengths of these flexible shafts are increased, the energy absorption properties are improved. However, the mass is increased, the vibrational mode is easily changed, and the influence of whirling is increased. Consequently, the flexible shafts flutter the worms 212, 212, causing unusual sounds or heating. In the present embodiment, on the other hand, the rotating mechanism 230 having high rotational energy is interposed between the drive unit 220 and one gear mechanism 210 (the left one in FIG. 1) (conventionally, there is no other choice but to dispose a long flexible shaft therebetween). Thus, as with the third flexible shaft 235 connecting between the drive unit 220 and the other worm 212, short flexible shafts can be used as the first and second flexible shafts 233, 234. If the flexible shafts are formed of the same material, a shorter one, of course, has a smaller weight. Accordingly, the kinetic energy of the flexible shafts 233, 234, 235 is lower than that of the rotating mechanism 230 and drive unit 220. Further, the kinetic energy of the flexible shafts 233, 234, 235 is smaller than the friction forces and damping forces between the worms 212, 212 and worm wheels 213, 213 serving as the rotating parts of the gear mechanisms 210, 210.

One gear mechanism using a conventional long flexible shaft is more significantly affected by unusual sounds or temperature increase than the other not using such a shaft. In the present embodiment, the rotating mechanism 230 is provided in place of a long flexible shaft. Compared to a structure not including the rotating mechanism 230, the movements in the radial and thrust directions become smaller. Thus, a whirling movement resulting from a secondary inertial force is less likely to occur, and an inertial force resulting from a counterforce that corrects whirling is small. However, the rotating mechanism 230 also makes a whirling movement, although it is small. If the rotational force thereof is transmitter to a worm 212 as it is, the worm 212 may be fluttered. For this reason, in the present embodiment, flexible shafts having small kinetic energy are used not only as the third flexible shaft 235, but also as the first and second flexible shafts 233, 234. These flexible shafts absorb the whirling movements, suppressing the fluttering of the worms 212, 212 of the gear mechanisms 210, 210.

In order, for the flexible shafts 233, 234, 235 to more efficiently absorb the vibration of the rotating mechanism 230 and drive unit 220 in the radial and thrust directions, the flexible shafts 233, 234, 235 are connected to the rotating mechanism 230 and drive unit 220 without being fixed thereto so as to be movable in the thrust direction, preferably in a range of the order of 1 to 5 mm, more preferably with a clearance of 0.5 mm or less in the radial direction, as described above. In other words, since the flexible shafts 233, 234, 235 rotate with the rotating shaft 232 of the rotating mechanism 230 and the output shaft 222 of the drive unit 220, they preferably have slight play in the radial direction and are connected so as to be movable in the thrust direction in a range of several mm, although they rotate approximately integrally with the rotating shaft 232 and output shaft 222 in the radial direction. More specifically, the flexible shafts 233, 234, 235 are preferably configured as follows: the ends of the first flexible shaft 233 are inserted in the worm 212 of one gear mechanism 210 and one end of the rotating shaft 232 without being fixed by swaging or the like with a clearance of 0.5 mm or less in a rectangular hole for connection formed in either end; the ends of the second flexible shaft 234 are inserted in the drive unit 220 and the other end of the rotating shaft 232 in the same manner; and the ends of the third flexible shaft 235 are inserted in the drive unit 220 and the worm 212 of the other gear mechanism 210 in the same manner. The vibration of the rotating mechanism 230 and drive unit 220 is more efficiently absorbed by movements in the radial and thrust directions of the flexible shafts 233, 234, 235 having small kinetic energy. Also, perpendicular-to-axis component forces resulting from the whirling of the flexible shafts 233, 234, 235 are absorbed by the elasticity of the bearings 231, 231.

Preferably, at least part of the circumferential surface of the drive unit 220 is covered by an elastic member 225. In the present embodiment, as shown in FIGS. 4 and 5(*d*), the elastic member 225 is approximately in the shape of a rhombus or ellipse and has an insertion hole 225*a* in which the drive unit 220 consisting of a motor is inserted. The elastic member 225 has outside penetration holes 225*b*, 225*b* in both outside areas sandwiching the insertion hole 225*a*. As with the bearings 231, 231, the elastic member 225 is formed of rubber or synthetic resin, preferably rubber. By covering the circumferential surface of the drive unit 220 with the elastic member 225, the vibration of the motor serving as the drive unit 220 is damped and made less likely to be transmitted, and unusual sounds are suppressed. The elastic member 225 adjusts the rotating shaft 232 and flexible shafts 233, 234, 235 so that these shafts autonomously become approximately concentric, suppresses the vibration resulting from the whirling of these shafts, and suppresses the damping of the kinetic energy of the drive unit 220.

Reinforcing frames 240, 240 formed of a pipe material are disposed so as to be inserted in the outside penetration holes 225*b*, 225*b* formed in both outside areas of the elastic member 225 and the outside penetration holes 231*d*, 231*d* formed in the bearings 231, 231. The reinforcing frames 240, 240 have a length corresponding to the distance between the pair of sliders 10, 10, and ends 240*a*, 240*a* thereof are fixed to the upper rails 12, 12 with tubular mounting members 241, 241 therebetween. The tubular mounting members 241, 241 are fastened to the upper walls of the upper rails 12, 12 on both sides of the cover members 211, 211 of the gear mechanisms 210, 210 with screws. Thus, the drive unit 220 and the pair of bearings 231, 231 are stably supported by the two reinforcing frames 240, 240 between the upper rails 12, 12.

As described above, the bearings 231, 231 have, approximately in the centers thereof, the rotating-shaft penetration holes 231*a*, 231*a* in which the bearing components 231*b*, 231*b* are inserted. Each bearing 231 has the outside penetration holes 231d, 231d in both outside areas sandwiching the rotating-shaft penetration hole 231a, and the reinforcing frames 240, 240 extend between the corresponding outside penetration holes 231d, 231d of the bearings 231, 231. As a result, in each bearing 231, the region around the rotating-shaft penetration hole 231a having the rotating shaft 232 disposed therein [a region X in FIG. 17(a)] is set as a soft spring region having 3 relatively low spring constant, compared to the regions located outside that region and around the outside penetration holes 231d, 231d having the reinforcing frames 240, 240 inserted therein [regions Y in FIG. (a)]. Thus, the whirling vibration transmitted to the rotating shaft 232 is phase-controlled and damped between the region around the rotating-shaft penetration holes 231a and the regions around the outside penetration holes 231d, 231d.

According to the present embodiment, when the motor serving as the drive unit 220 rotates, the rotating shaft 232 of the rotating mechanism 230 rotates by the rotational kinetic energy of the motor. As described above, the rotating shaft 232 is supported by the pair of bearings 231, 231 and autonomously aligned, has low secondary inertial forces in the thrust and radial directions, and prevents the rotational force of the drive unit 220 from being significantly damped. The rotating mechanism 230 can be grasped as acting as a rotating mechanism independent of the drive unit 220, sliders 10, 10, and the like. Although the distance from the drive unit 220 to one gear mechanism 210 (the left one in FIG. 1) is longer than the distance from the drive unit 220 to the other gear mechanism 210 (the right one in FIG. 1), the rotational force of the drive unit 220 is transmitted through the rotating shaft 232 having the second greatest kinetic energy next to the drive unit 220. Thus, although the first and second flexible shafts 233, 234 are disposed on the ends of the rotating shaft 232, the rotational force is transmitted to the worms 212 with a slight energy loss. In other words, the gear mechanisms 210, 210 are given rotational kinetic energy by the action of the two rotating mechanisms, the drive unit 220 and rotating mechanism 230. Thus, there is reduced an energy transmission loss attributable to sounds or friction from the flexible shafts that absorb a shock which occurs when synchronizing the drive unit 220 and other members or switching the rotation direction thereof between the CW and CCW directions. Further, there is no great difference between the rotational energy transmitted to one gear mechanism 210 and the rotational energy transmitted to the other gear mechanism 210 through the third flexible shaft 235 directly connected to the output shaft of the drive unit 220. That is, the rotational force of the drive unit 220 is transmitted extremely efficiently. Thus, it is possible to use, as the motor serving as the drive unit 220, a smaller, more lightweight motor than that in a conventional structure, which must use a flexible shaft having a length corresponding to the distance from the drive unit 220 to the other gear mechanism 210 (the right one in FIG. 1). The rotational forces transmitted to the worms 212, 212 cause the worm wheels 213, 213 to rotate. The rotation of the worm wheels 213, 213 relative to the slide screws 11a, 11a causes the upper rails 12, 12 having the gear mechanisms 210, 210 connected thereto to move forward or backward.

The configuration of the present embodiment need hot use long flexible shafts unlike in a conventional structure; instead, if absorbs whirling movements caused by secondary inertial forces resulting from misalignment and transmit the rotational forces to the gear mechanisms 210, 210 using the flexible shafts 233, 234, 235 having small kinetic energy. Thus, it is possible to suppress unusual sounds or beating resulting from the contact between the worms 212, 212 and worm wheels 213, 213 of the gear mechanisms 210, 210. Further, the drive unit 220 is disposed in such a manner that the circumferential surface thereof is partially covered by the elastic member 225, and the bearings 231, 231 supporting the rotating shaft 232 are formed of elastic members. Thus, the output shafts 221, 222 of the drive unit 220 are autonomously aligned; the coaxiality of the output shafts 221, 222 is increased; vibration that occurs in the drive unit 220 is absorbed by the elastic member 225; vibration resulting from the whirling of the rotating shaft 232 is more likely to be absorbed by the bearings 231, 231 formed of the elastic members; and unusual sounds attributable to these types of vibration are suppressed.

FIGS. 7 to 10 are drawings showing a power seat sliding device 1' of a second embodiment of the present invention. Note that the same members as those of the power seat sliding device 1 of the first embodiment are represented by the same reference signs. In a rotating mechanism 230' of the present embodiment, an auxiliary drive unit 236 consisting of a motor is disposed between the pair or bearings 231, 231 of the first embodiment, and a rotating shaft 232 is connected to an output shaft 236a of the auxiliary drive unit 236.

The circumferential surface of the auxiliary drive unit 236 is at least partially covered by an approximately oval elastic member 237. Specifically, the elastic member 237 has an insertion hole 237a in the central portion thereof and also has outside penetration holes 237b, 237b in both outside areas sandwiching the insertion hole 237a. The elastic member 237 is disposed by inserting the auxiliary drive unit 236 connected to the rotating shaft 232 into the insertion hole 237a. Reinforcing frames 240, 240 are disposed so as to be inserted in outside penetration holes 225b, 225b of an elastic member 225 disposed on the circumferential surface of the drive unit 220 consisting of a motor and outside penetration holes 231d, 231d of a pair of bearings 231, 231, as well as the outside penetration holes 237b, 237b of the elastic member 237 disposed on the circumferential surface of the auxiliary drive unit 236 consisting of a motor.

As with the elastic member 225 covering the drive unit 220, the elastic member 237 covering the auxiliary drive unit 236 is formed of rubber, synthetic resin, or the like, preferably rubber. The disposition of the elastic member 237 allows the auxiliary drive unit 236 to be disposed in a stable position. The disposition of the elastic member 237 also can help suppress the vibration of the auxiliary drive unit 236 consisting of a motor at the time of driving, the vibration of the rotating shaft 232, and whirling vibration caused by the secondary inertial forces of flexible shafts 233, 234, 235, as well as suppresses unusual sounds attributable to these types of vibration. As seen above, as with the elastic member 225 covering the drive unit 220, the elastic member 237 covering the auxiliary drive unit 236 performs the function of suppressing the transmission loss of the kinetic energy of the drive unit 220 and auxiliary drive unit 236.

In the present embodiment, the rotating mechanism 230' includes the auxiliary drive unit 236 consisting of a motor. For this reason, in the rotating mechanism 230,' a rotational force based on electric energy generated by the auxiliary drive unit 236 causes the rotating shaft 232 to rotate. While the rotating mechanism 230 of the first embodiment is configured to rotate easily, it causes the rotating shaft 232 to rotate by following a rotational force generated by the drive unit 220, which is a main motor. In the present embodiment, on the other hand, a rotational force is generated not only by the drive unit 220, which a main motor, but also by the auxiliary drive unit 236, which is another motor and directly rotates the rotating shaft 232. The rotational forces based on the electric energy of both motors can be used. Thus, the rotational kinetic energy of the rotating mechanism 230' is greater than that of the rotating mechanism 230 of the first embodiment and is approximately equivalent to the rotational kinetic energy of the drive unit 220. For this reason, when transmitting a rotational force equivalent to that of the first embodiment to the gear mechanisms 210, 210, a smaller, more lightweight motor than that of the first embodiment can be used as the drive unit 220. In other words, since the two motors, the drive unit 220 and auxiliary drive unit 236, are used, a rotational force equivalent to that of the first embodiment can be transmitted using a smaller, more lightweight motor.

Figure 11:
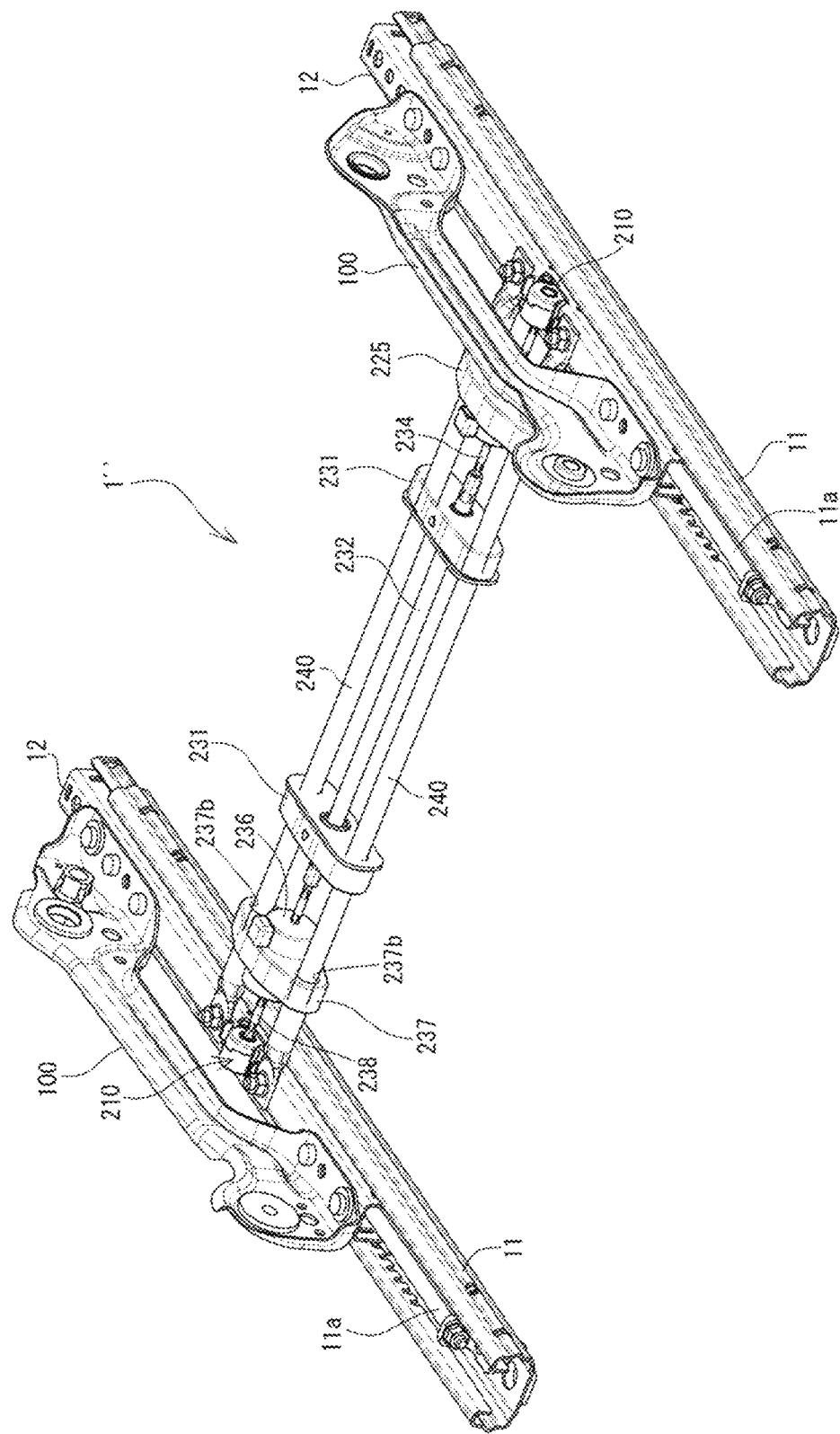
FIG. 11 is a perspective view showing a power seat sliding device 11 of a third embodiment of the present invention seen from the front.
Figure 12:
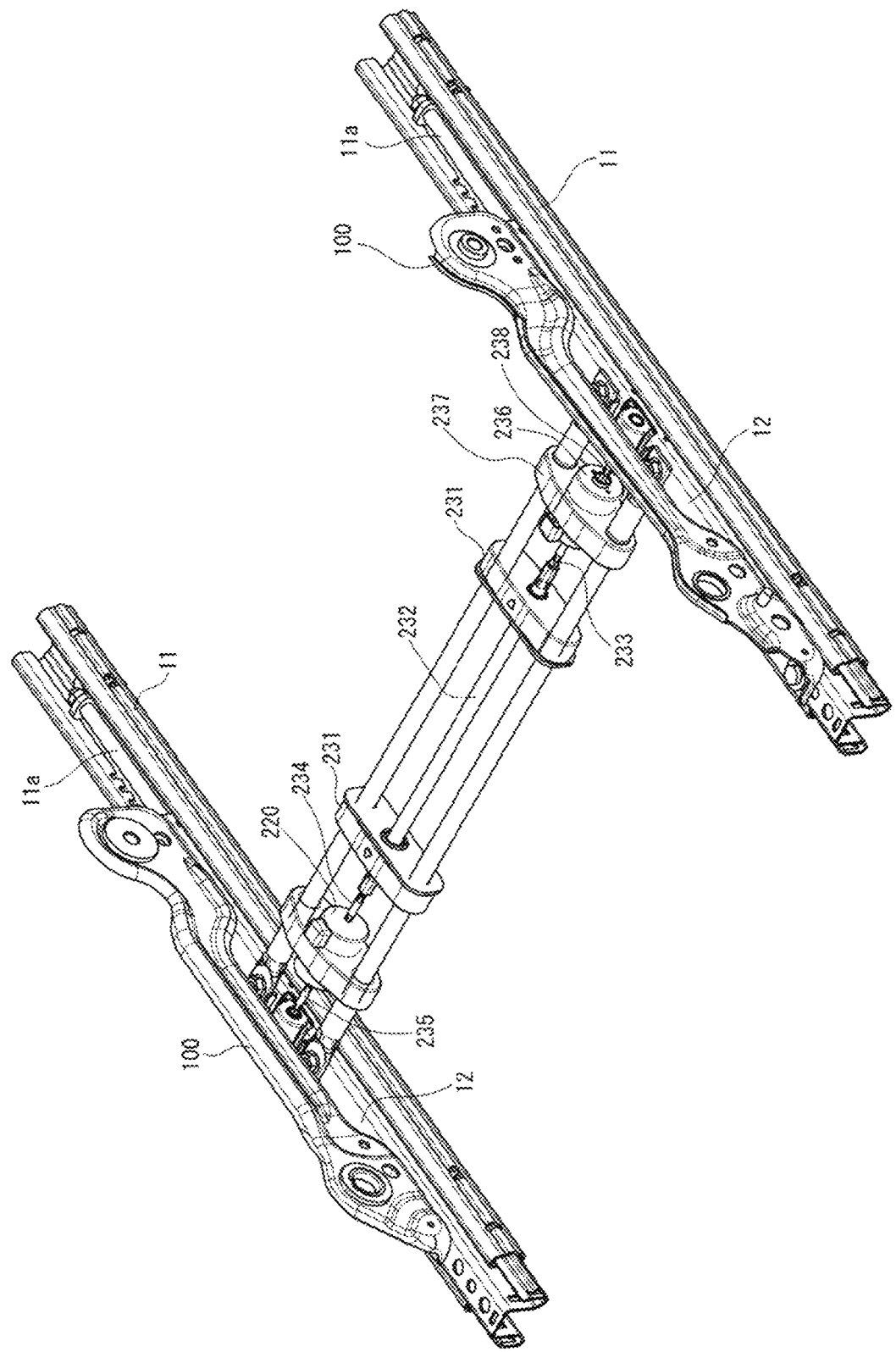
FIG. 12 is a perspective view of the power seat sliding device in FIG. 11 seen from the rear.
Figure 13:
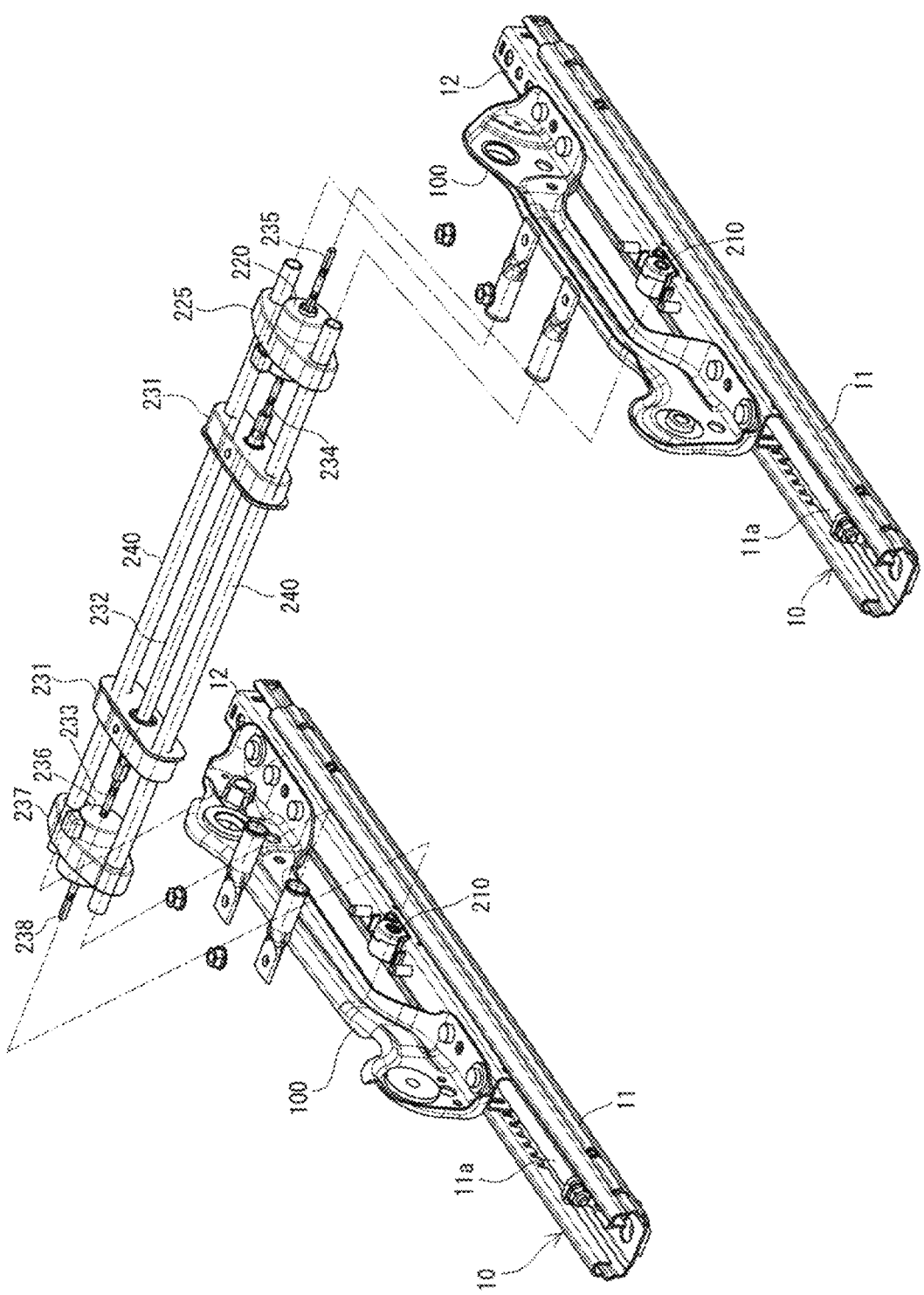
FIG. 13 is a perspective view showing a state in which a drive unit and a rotating mechanism are removed from sliders in the power seat sliding device in FIG. 11.
Figure 14:
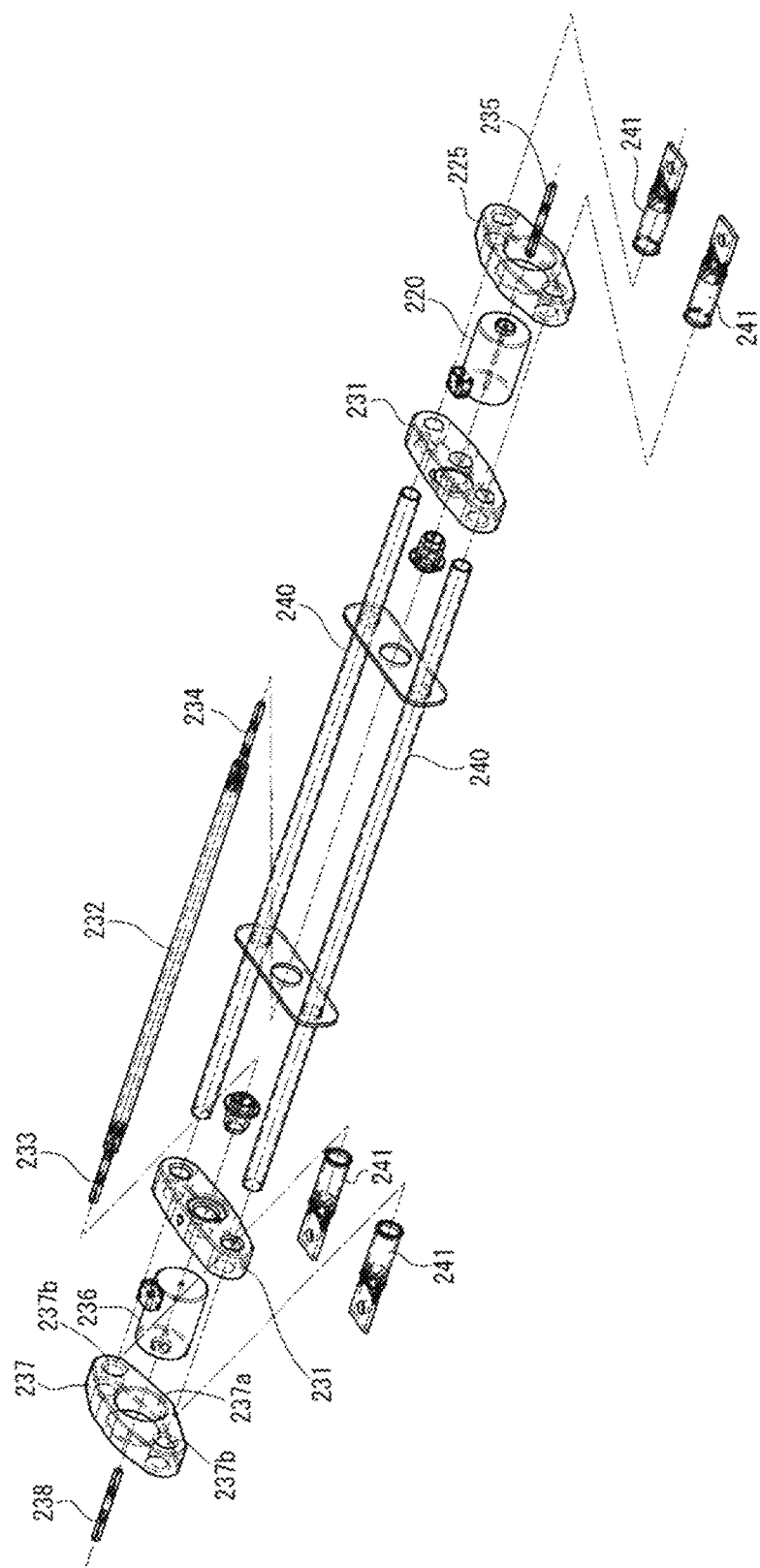
FIG. 14 is an exploded perspective view showing the structures of the drive unit and rotating mechanism in the power seat sliding device in FIG. 11.

The mounting position of the auxiliary drive unit 236 is not limited to that shown in FIGS. 7 to 10, For example, there may be used the configuration of a power seat sliding device 1" of a third embodiment of the present invention shown in FIGS. 11 to 14. Specifically, the auxiliary drive unit 236 disposed between the pair of bearings 231, 231 in the second embodiment is disposed between one bearing 231 (the left one in FIG. 11) and one gear mechanism 210 (the left one in FIG. 11). Reinforcing frames 240, 240 are disposed so as to be inserted in outside penetration holes 237b, 237b of an elastic member 231 disposed on the circumferential surface of the auxiliary drive unit 236. A first flexible shaft 233 located in a left portion of FIG. 11 is connected to an output shaft of the auxiliary drive unit 236. A fourth flexible shaft 238 is disposed between one gear mechanism 210 (the left one in FIG. 11) and the auxiliary drive unit 236. The fourth flexible shaft 238 connects between an output shaft of the auxiliary drive unit 236 and the one gear mechanism 210 (the left one in FIG. 11).

As with that of the second embodiment, the power seat sliding device of the present embodiment also includes the two rotational force generation mechanisms, the drive unit 220 and auxiliary drive unit 236. Thus, it is possible to reduce the transmission loss of the rotational force using a small, lightweight motor, to suppress vibration, and to reduce unusual sounds caused by vibration or heating attributable to friction, collision, or vibration in the gear mechanisms 210, 210.

Figure 15:
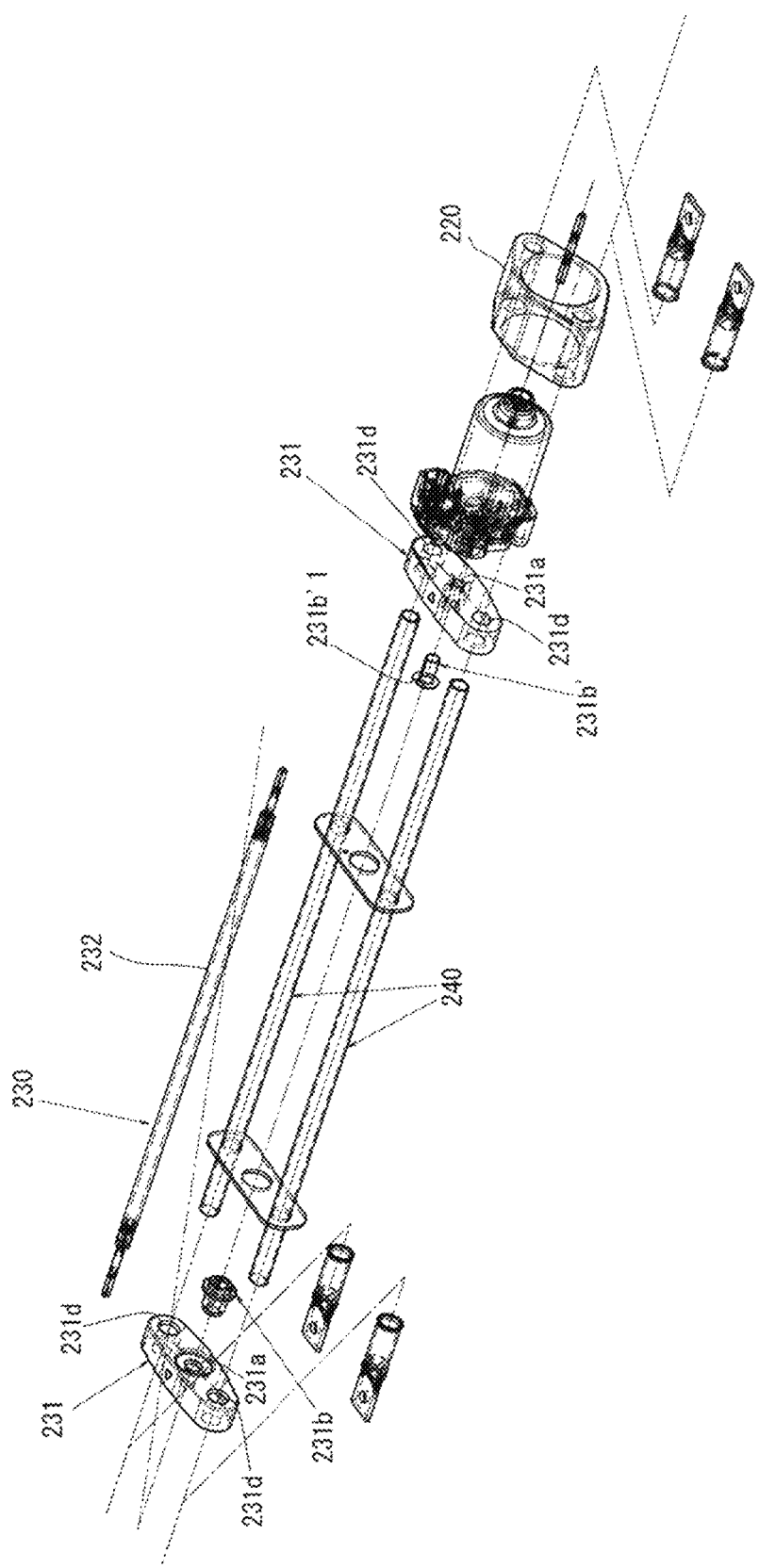
FIG. 15 is an exploded perspective view showing the structures of an drive unit and a rotating mechanism of an example of a power seat sliding device of a fourth embodiment of the present invention.
Figure 16:
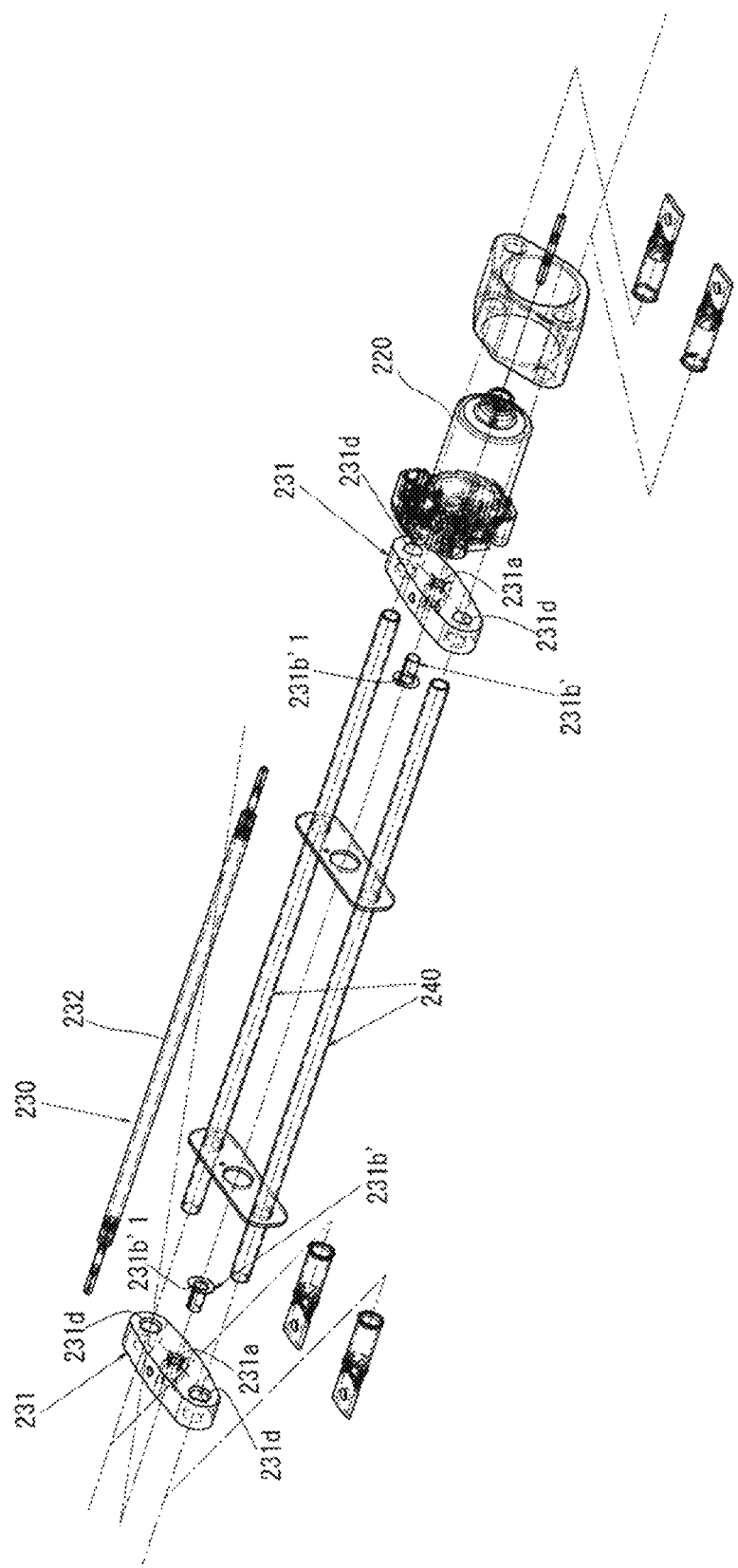
FIG. 16 is an exploded perspective view showing the structures of a drive unit and a rotating mechanism of another example of the power seat sliding device of the fourth embodiment of the present invention.
Figure 17:
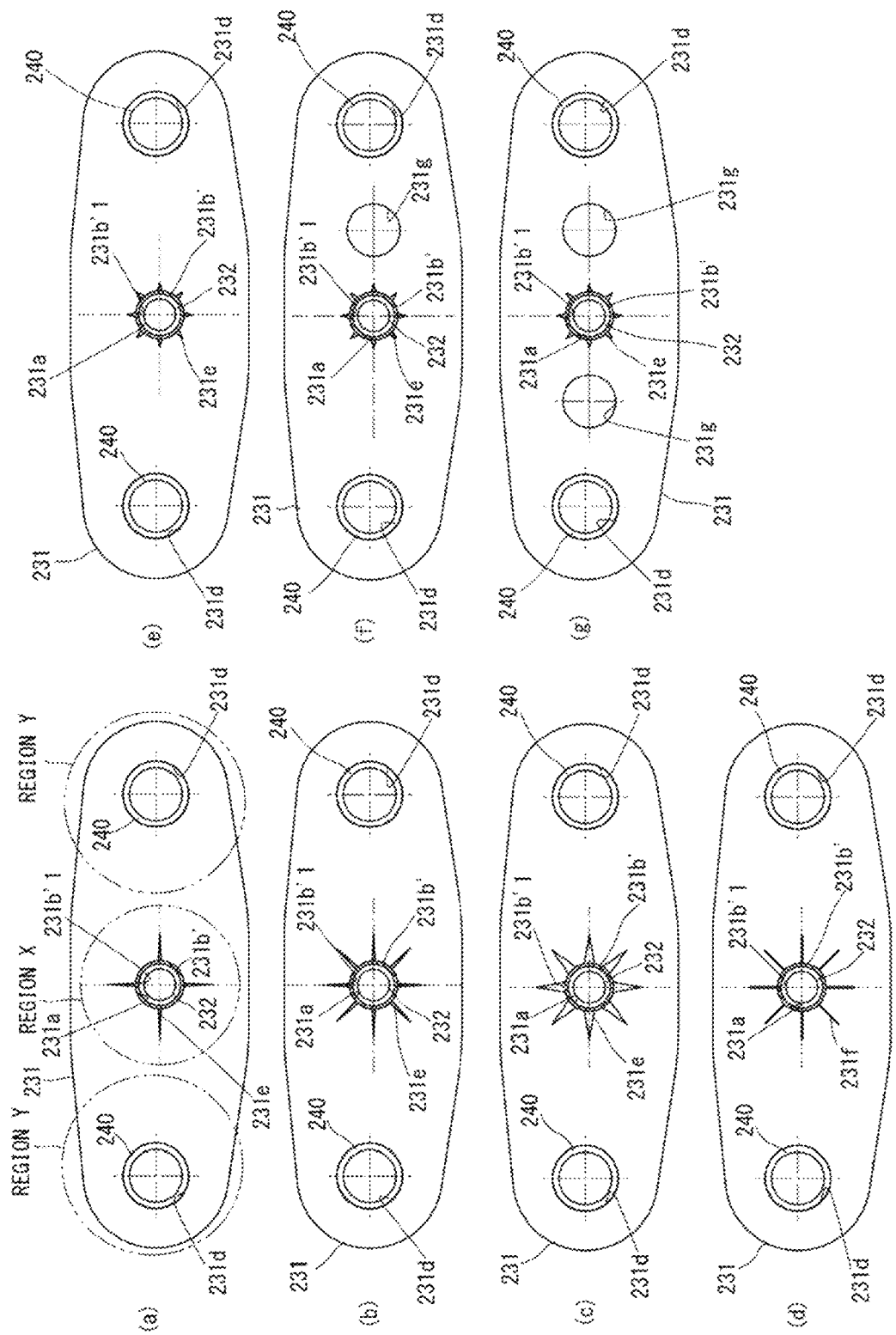
FIGS. 17(a) to 17(g) are drawings showing the structure of a bearing used in the fourth embodiment.

FIGS. 15 to 17 show a fourth embodiment of the present invention. The members having the same functions as the functions of those of the above embodiments are represented by the same reference signs. As described above, bearings 231, 231 are formed of elastic members such as rubber and have, approximately in the center thereof, rotating-shaft penetration holes 231a, 231a in which a rotating shaft 232 is disposed. For this reason, a predetermined region around the rotating-shaft penetration hole 231a supporting a rotating shaft 231 consists of a soft spring region X having a relatively low spring constant. A predetermined region outside that region and around outside penetration holes 231d, 231d having the reinforcing frames 240, 240 inserted therein consists of a hard spring region Y having a relatively high spring constant [see FIG. 17(a)]. The vibration of the rotating shaft 232 can be phase-controlled and damped between these two types of regions. The present embodiment shows an aspect in which this function can be performed more remarkably.

Specifically, in a structure or the present embodiment, one or more notches or slits at a predetermined depth from the inner circumferential surface of the rotating-shaft penetration hole 231a are formed in a predetermined region around the rotating-shaft penetration holes 231a in the soft spring region X. FIGS. 17(a) to 17(g) show examples of such a structure. FIGS. 17(a) to 17(c) and 17(e) to 17(g) show examples in which notches 231e each having a triangular pyramid-shaped section are formed so as to radially extend from the inner circumferential surface of the rotating-shaft penetration hole 231a. FIG. 17(d) shows an example in which slits 231f are formed so as to radially extend from the inner circumferential surface of the rotating-shaft penetration hole 231a. The number, depth, positions, or the like of the notches or slits formed may be set to any number or the like so that the spring constant of the soft spring region X becomes a desired one. In FIG. 17(f), an adjustment penetration hole 231g is formed between the rotating-shaft penetration hole 231a and the outside penetration hole 231d on the right side. Thus, compared to FIG. 17(e) in which the same number of notches 231e having the same shape are formed on the inner circumferential surface of the rotating-shaft penetration hole 231a, the restoring force of the soft spring region X is more likely to work in the direction of the rotating shaft 232 inserted in the rotating-shaft penetration hole 231a, and a damping force resulting from the deformation of the vicinity of the penetration hole 231e can be increased. As shown in FIG. 17(g), to adjust the restoring force or damping force, adjustment penetration holes 231g may be formed on both sides of the rotating-shaft penetration hole 231a. The restoring force or damping force can preferably be adjusted as necessary and therefore there is no restriction on the shape, number, position, size, or the like of adjustment penetration holes 231g formed.

A bearing component 231b' is inserted in the rotating-shaft penetration hole 231a. The bearing component 231b' may be a bush that is formed of a metal, a synthetic resin, or the like, has excellent wear resistance and a small friction coefficient, and can radially expand and shrink. For example, a bush where a slit 231b'1 is formed in the length direction thereof may be used as a structure which can radially expand and shrink. The rotating-shaft penetration hole 231a has an inner diameter that allows the bearing component 231b' having such a structure to be inserted thereinto by press-fitting. The restoring force of the soft spring region X works on the bearing component 231b' press-fitted into the rotating-shaft penetration hole 231a from the outside. Thus, the bearing component 231b' is always elastically energized in a direction in which the opposed edges of the slit 231b'1 circumferentially come close to each other, that is, in a direction in which the width of the slit 231b'1 is narrowed.

Accordingly, the rotating shaft 232 inserted in the bearing component 231b' is supported in the bearing component 231b', which is a bush having a small friction coefficient, and thus smoothly rotates without receiving great friction resistance. On the other hand, the outer circumferential surface of the rotating shaft 232 is elastically supported by the restoring force of the soft spring region X working on the bearing component 231b', and a speed/displacement-dependent damping force works by a friction force corresponding to this restoring force. Thus, the vibration of the rotating shaft 232 associated with the rotation of the motor serving as the drive unit 220 is damped in the bearing 231. Even if the inner surface of the bearing component 231b' is worn by the rotation of the rotating shaft 232, the bearing component 231b' is always elastically energized by the restoring force of the inner circumferential surface of the rotating-shaft penetration hole 231a so that the opposed edges of the slit 231b1 circumferentially come close to each other. Thus, the bearing component 231b' always reduces its diameter by following the wear, thereby preventing the formation of a clearance between both due to the wear and thus preventing a wobble attributable to a clearance.

Although the pair of left and right bearings 231, 231 are provided, the structure of the present embodiment using the region having the rotating-shaft penetration hole 231a supporting the rotating shaft 232 as the soft spring region X and including the bearing component 231b' may be provided only to one bearing 231 (the right one in FIG. 15), and the other bearing 231 (the left one in FIG. 15) may be used as a bearing by inserting thereinto a tubular bearing component 231b formed of a synthetic resin similar to those of the above embodiments, as shown in FIG. 15. Also, the structure including the bearing component 231b' of the present embodiment may be provided to both, as shown in FIG. 16.

Experimental Example 1

Figure 18:
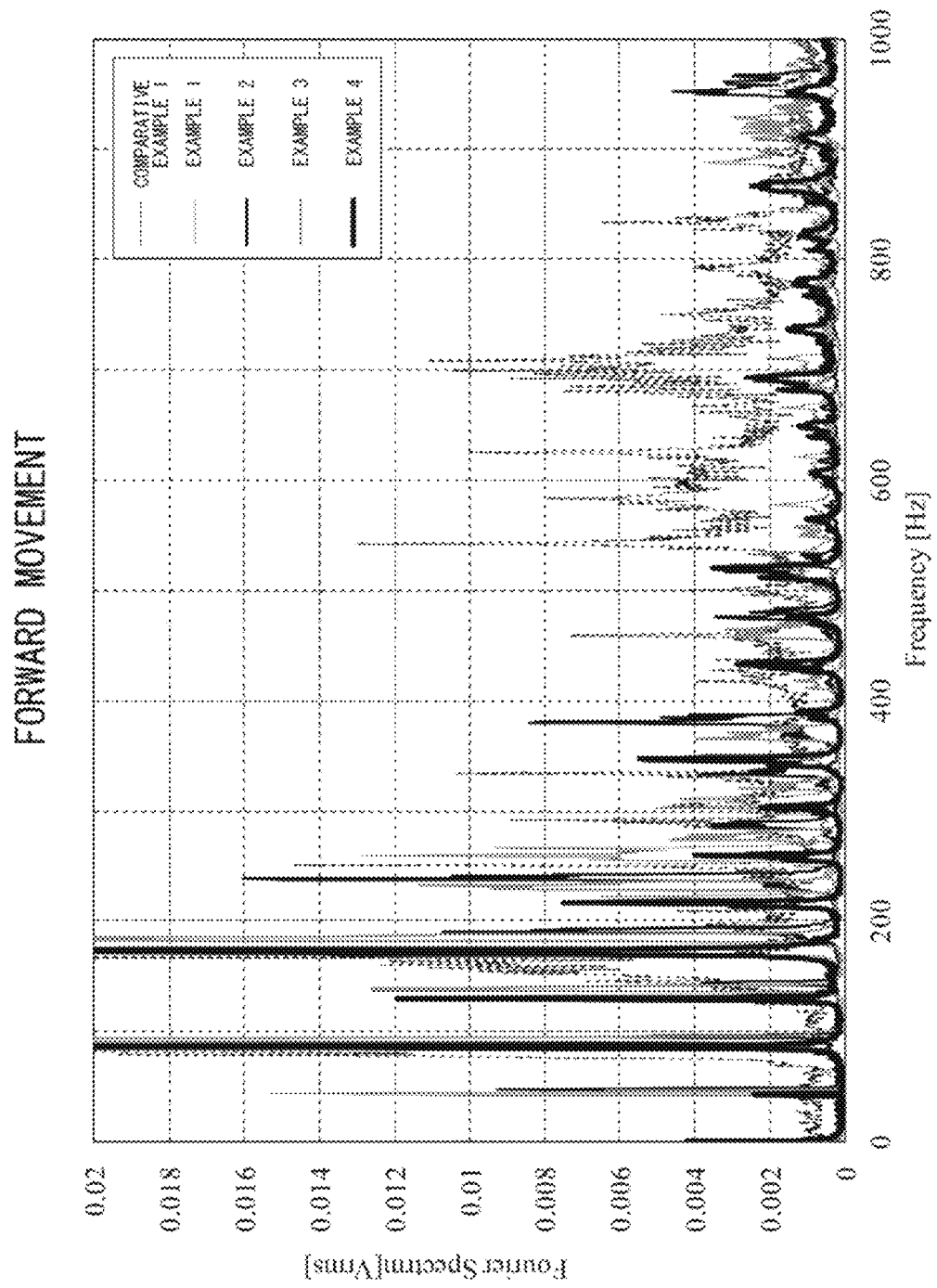
FIG. 18 is a diagram showing an experiment result relating to the vibration of the power seat sliding device during a forward movement in Experiment Example.
Figure 19:
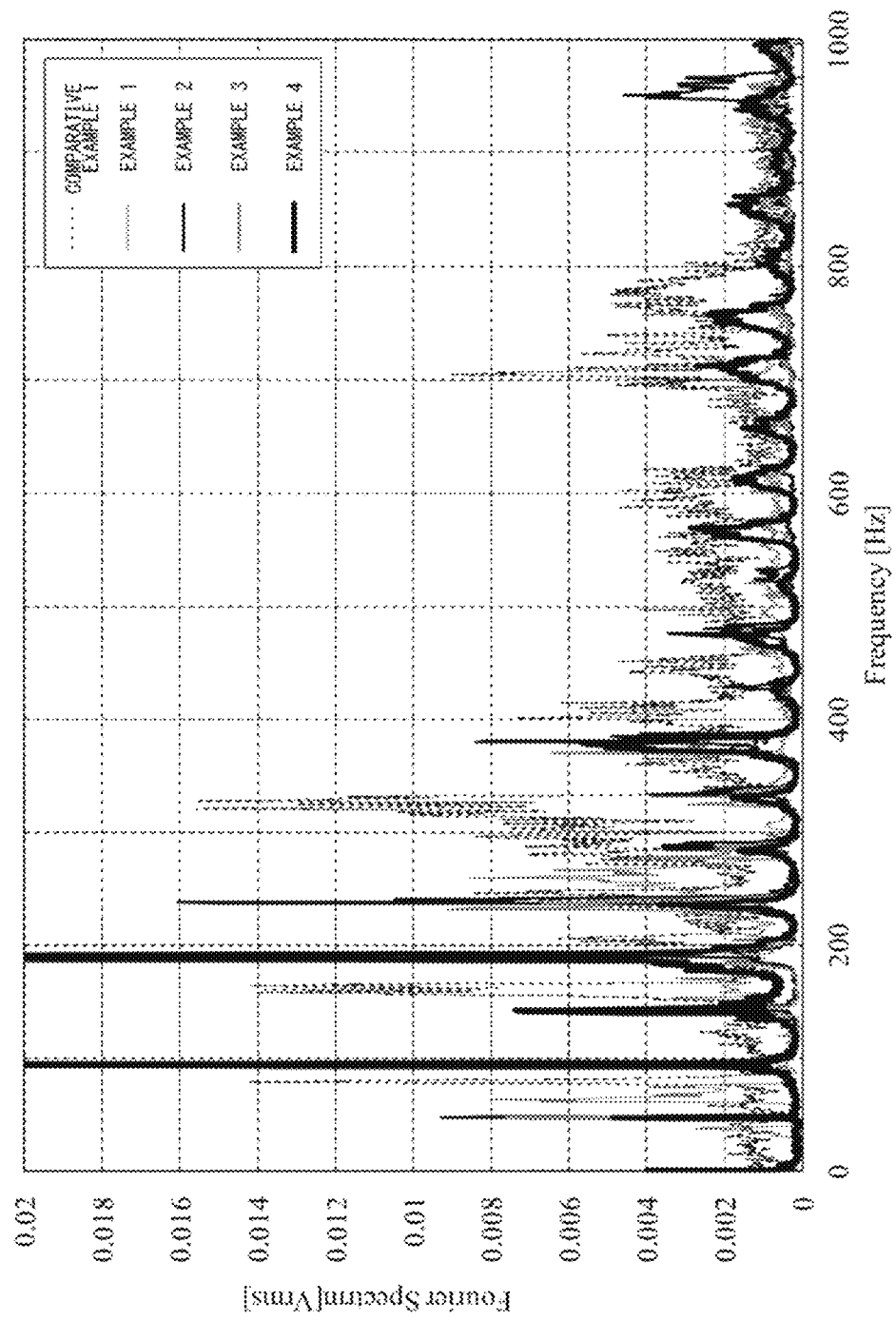
FIG. 19 is a diagram showing an experiment result relating to the vibration of the power seat sliding device during a backward movement in Experiment Example.

A vibration sensor was attached to each of a conventional power seat sliding device (Comparative Example 1) and some aspects (Examples 1 to 4) of the power seat sliding device 1 of the present invention, and a vibration level that causes unusual sounds was determined by analyzing the frequency of detection signals of the vibration sensor. The results are shown in FIGS. 18 and 19. FIG. 18 shows the results during a forward movement, and FIG. 19 shows the results during a backward movement.

"Comparative Example" is a conventional power seat sliding device in which a rotating shaft 23 is not used; a supporting steel plate (a center plate) replacing reinforcing frames 240, 240 extends between upper rails 12, 12; and a drive unit 220 and a flexible shaft having a length corresponding to the distance from the drive unit 220 to the other gear mechanism 210 (the right one in FIG. 1) are fixed to and supported by this center plate.

"Example 1" is basically the same as the power seat sliding device 1 of the first embodiment shown in FIGS. 1 to 6. However, in Example 1, bearing components 231b, 231b are not inserted in bearings 231, 231; rotating-shaft penetration holes 231a, 231a themselves are used as bearing holes; and the ends of a rotating shaft 232 are rotatably supported by the rotating-shaft penetration holes 231a, 231a. Both left and right clearances between the inner circumferential surfaces of the rotating-shaft penetration holes 231a, 231a and the outer circumferential surface of the rotating shaft 232 are set to a range of 0 to 0.5 mm so that the opposed two circumferential surfaces are in contact with each other without being pressed. For the rotating shaft 232 used, the outer diameter was 9.0 mm; the plate thickness was 1.0 mm; and the mass was 56 g. The ends of the rotating shaft 232 and the ends close to the rotating shaft 232, of first and second flexible shafts 233, 234 were swaged together. The opposite ends of the first and second flexible shafts 233, 234 and both ends of a third flexible shaft 235 were connected to gear mechanisms 210, 210 or a drive unit 220 without being swaged.

"Example 2" has basically the same structure as the power seat sliding device 1 of the fourth embodiment shown in FIG. 16. Slits 231f having a shape similar to that shown in FIG. 17(d) are formed in the inner circumferential surfaces of rotating-shaft penetration holes 231a, 231a of bearings 231, 231. Metallic bearing components 231b', 231b' each having a slit 231b'1 are inserted in the rotating-shaft penetration holes 231a, 231a. The ends of a rotating shaft 232 are inserted in the rotating-shaft penetration holes 231a, 231a so as to be slightly press-fitted. For the rotating shaft 232 used, the outer diameter was 6.35 mm; the plate thickness was 1.6 mm; and the mass was 40 g. The ends of the rotating shaft 232 and the ends close to the rotating shaft 232, of first and second flexible shafts 233, 234 were swaged together. The opposite ends of the first and second flexible shafts 233, 234 and both ends of a third flexible shaft 235 were connected to gear mechanisms 210, 210 or a drive unit 220 without being swaged.

"Example 3" is basically the same as the power seat sliding device 1 of the first embodiment shown in FIGS. 1 to 6. However, metallic bearing components 231b', 231b' each having a slit were inserted in bearings 231, 231. Also, the end close to one gear mechanism 210, of a rotating shaft 232 was inserted in the bearing 231 close to the one gear mechanism 210 so as to be slightly press-fitted into the bearing component 231b'. The clearance between the outer circumferential surface of the end close to a drive unit 220, of the rotating shaft 232 and the inner surface of the bearing component 231b' in the bearing 231 close to the drive unit 220 was set to 0 to 0.5 mm so that the opposed two circumferential surfaces are in contact with each other without being pressed. Thus, the rotating shaft 232 of the third Example was supported in such a manner that the end close to the drive unit 220 thereof is more likely to make whirling vibration around the end close to the one gear 210 thereof. For the rotating shaft 232 used, the outer diameter was 8.0 mm; the plate thickness was 1.0 mm; and the mass was 72 g. In "Example 3," unlike in "Example 1" and "Example 2," the ends of the rotating shaft 232 and the ends close to the rotating shaft 232, of first and second flexible shafts 233, 234 were inserted and connected to each other without being swaged and were movable in a range of 5 mm in the thrust direction. The opposite ends of the first and second flexible shafts 233, 234 and both ends or a third flexible shaft 235 were connected to the gear mechanisms 210, 210 or drive unit 220 without being swaged.

"Example 4" had approximately the same configuration as "Example 3," and bushes formed of a synthetic resin were used as bearing components 231b, 231b. The clearance between the inner circumferential surface of each bearing component 231b and the outer circumferential surface of a rotating shaft 232 was set to a range of 0 to 0.5 mm so that the opposed two circumferential surfaces are in contact with each other without being pressed. A method for connecting the rotating shaft 232 and flexible shafts 233, 234, 235 used was also similar to that of "Example 3." Note that in "Example 4," a motor whose rotor makes smaller whirling vibration than that of a motor used in "Comparative Example 1" and "Examples 1 to 3" was used as a drive unit 220.

As shown in FIGS. 18 and 19, the vibration spectrum of "Comparative Example 1" was higher than those of "Example 1," "Example 2," "Example 3," and "Example 4" in a frequency range of about 250 to 850 Hz. The vibration of a power seat sliding device that a person seated on a seat cushion can hear as a sound and whose countermeasure needs to be taken is particularly vibration in a frequency range of about 250 to 850 Hz. If the frequency of vibration is lower than that range, the vibration is less likely to be transmitted as a sound; if the frequency of vibration is higher than that range, the vibration is damped in the air and is difficult to hear, since the strength of the vibration spectrum is low.

A comparison among "Example 1," "Example 2," "Example 3," and "Example 4" indicates: "Example 1" exhibited a high vibration spectrum intensity around 250 to 270 Hz and "Example 2" exhibited a high vibration spectrum intensity around 370 to 380 Hz; on the other hand, "Example 3" and "Example 4," where the rotating shaft and flexible shafts were not swaged, had no remarkable peak in a range of about 250 to 850 Hz and were excellent in terms of the incidence of unusual sounds caused by vibration. While "Example 3" exhibited a slightly high peak around 220 Hz, this range is a range where a human has difficulty in perceiving vibration as a sound. The reason why there was no great difference between "Example 3" and "Example 4" although "Example 3" used a motor whose rotor made greater whirling vibration than that of "Example 4" seems that "Example 3" had a structure in which whirling vibration is more likely to occur around the end close to one gear mechanism 210, of the rotating shaft 232 and therefore the dynamic damper function made a great contribution. On the other hand, "Example 4," which used a motor whose rotor made small whirling vibration, did not need to take a countermeasure as seen in "Example 3." "Example 4" also obtained a result equal to or better than that of "Example 3" although it used a synthetic-resin bush.

Experimental Example 2

Another power seat sliding device (Comparative Example 2) having the same conventional structure as Comparative Example 1 of Experimental Example 1 and the power seat sliding device of Example 4 or Experimental Example 1 were measured for vibrational levels were measured and compared. Details of the experiment are as follows.

EXPERIMENT METHOD (1) "Example 4" and "Comparative Example 2" used motors according to approximately similar specifications. Details of the motors are as follows.

Example 4: direct-current motor (using neodymium magnet); rated voltage (terminal voltage) 13V; rotation speed during application of rated load (load: 9.8±0.9 N·cm) 2600 rpm.

Comparative Example 2: direct-current motor (using ferrite magnet); rated voltage (terminal voltage) 12 V; rotation speed during application of rated load (load: 9.8±0.9 N·cm) 2850 rpm.

(2) To reproduce the angles of the power seat sliding devices when mounted on a car, each power seat sliding device was installed in such a manner that the front portion thereof is raised, and a load of 784 K was placed thereon. Each power seat sliding device was operated at full stroke in both forward and backward directions and measured for vibration and noise. Also, subjects (14 persons) were seated in place of the load of 784 N, and sensory evaluation on noise was performed.

Figure 20:
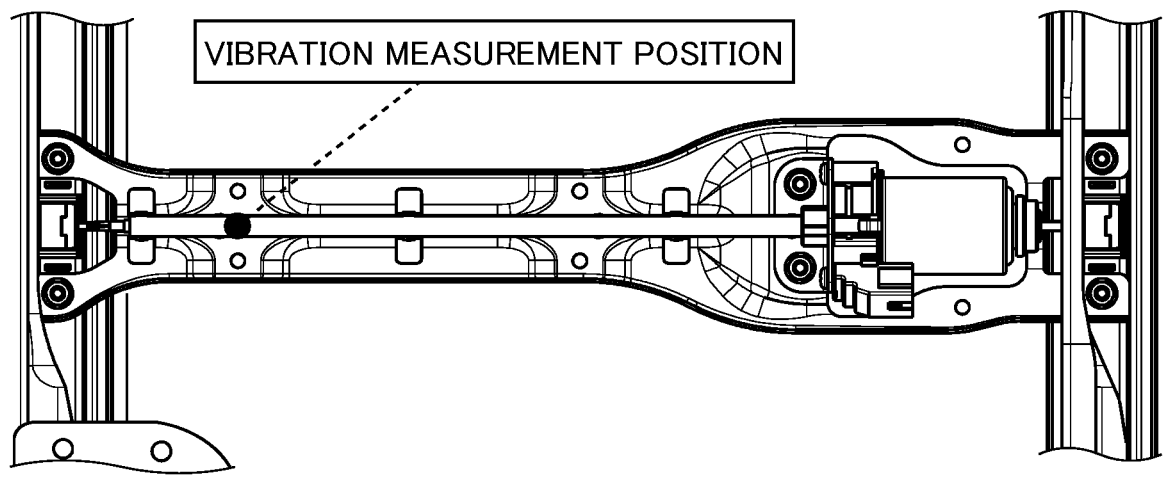
FIGS. 20(a) and 20(b) are drawings showing the mounting position of a vibration sensor.
Figure 20:
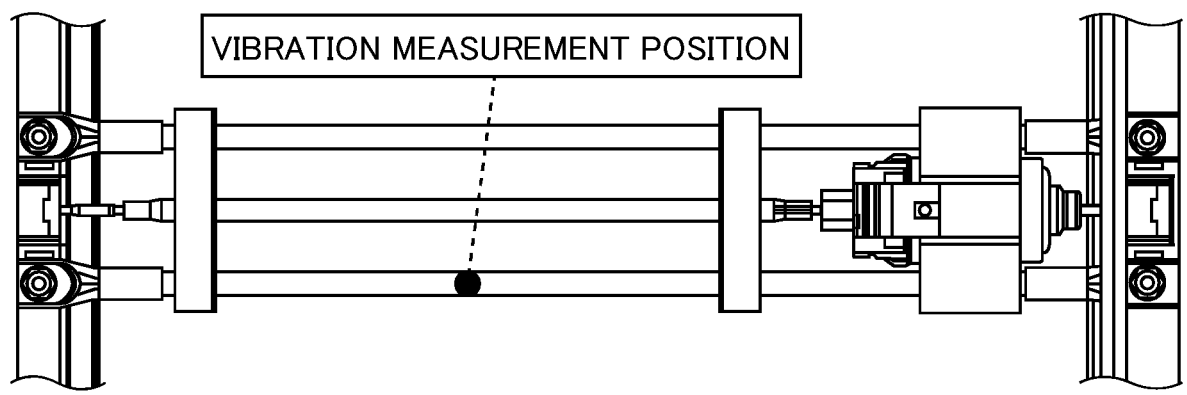

A piezoelectric acceleration pickup (PV-85 available from RION CO., LTD.) serving as a vibration sensor was attached to a "vibration measurement position" shown in FIG. 20(a) for Comparative Example 2 and a "vibration measurement position" shown in FIG. 20(b) for Example 4 and then vibration was measured. The "vibration measurement positions" were set on the basis of a technology disclosed in International Publication No. WO2014/092032 filed by the present applicant. When evaluating power seat sliding devices for unusual sounds using these positions, a vibration spectrum difference is more likely to be made in a range of 300 to 400 Hz, which makes it easy to distinguish between conforming products and non-conforming products. The same vibration measurement positions were used when measuring the other Comparative Example and Examples. The vibration sensor was attached to the vibration measurement position shown in FIG. 20(a) for Comparative Example 1 and the vibration measurement position shown in FIG. 20(b) for Examples 1 to 3 and then measurements were made. A noise meter (NL-14 available from RION CO., LTD.) was placed at a height of about 40 cm from the upper surface of the lower rail 11 of the slider 10. Sensory evaluations were made using a 5-grade, 6-item SD method, and an average was calculated. Ail measurements were made in a sound-proof room with a background noise of about 28 dB(A).

EXPERIMENT RESULTS

The noise measurement results are as follows: for Example 4, the sound pressure [dB(A)] was 38.0 dB during a forward movement and 37.9 during a backward movement; for Comparative Example 2, the sound pressure was 42.4 dB during a forward movement and 44.3 dB during a backward movement.

The sensory evaluations are shown in Table 1 below.

| Item | Forward Movement | | Backward Movement | |
| --- | --- | --- | --- | --- |
| | Comparative Example 2 | Example 4 | Comparative Example 2 | Example 4 |
| Bad/Good | 2.93 | 3.57 | 1.93 | 3.14 |
| Annoying/ Not Annoying | 2.93 | 3.86 | 2.00 | 3.14 |
| Noisy/Quiet | 2.71 | 4.14 | 1.71 | 3.00 |
| Strong/Weak Fluctuation Feeling | 3.14 | 3.86 | 2.64 | 3.29 |
| Rough/Smooth | 3.14 | 3.00 | 2.00 | 2.86 |
| Bad/Good Tone | 2.43 | 3.14 | 2.00 | 3.14 |

Example 4 indicated a lower sound pressure than Comparative Example 2, as well as obtained a higher sensory evaluation than Comparative Example 2. Particularly, Example 4 obtained a much higher evaluation than Comparative Example 2 with regard to Item "noisy/quiet."

Figure 21:
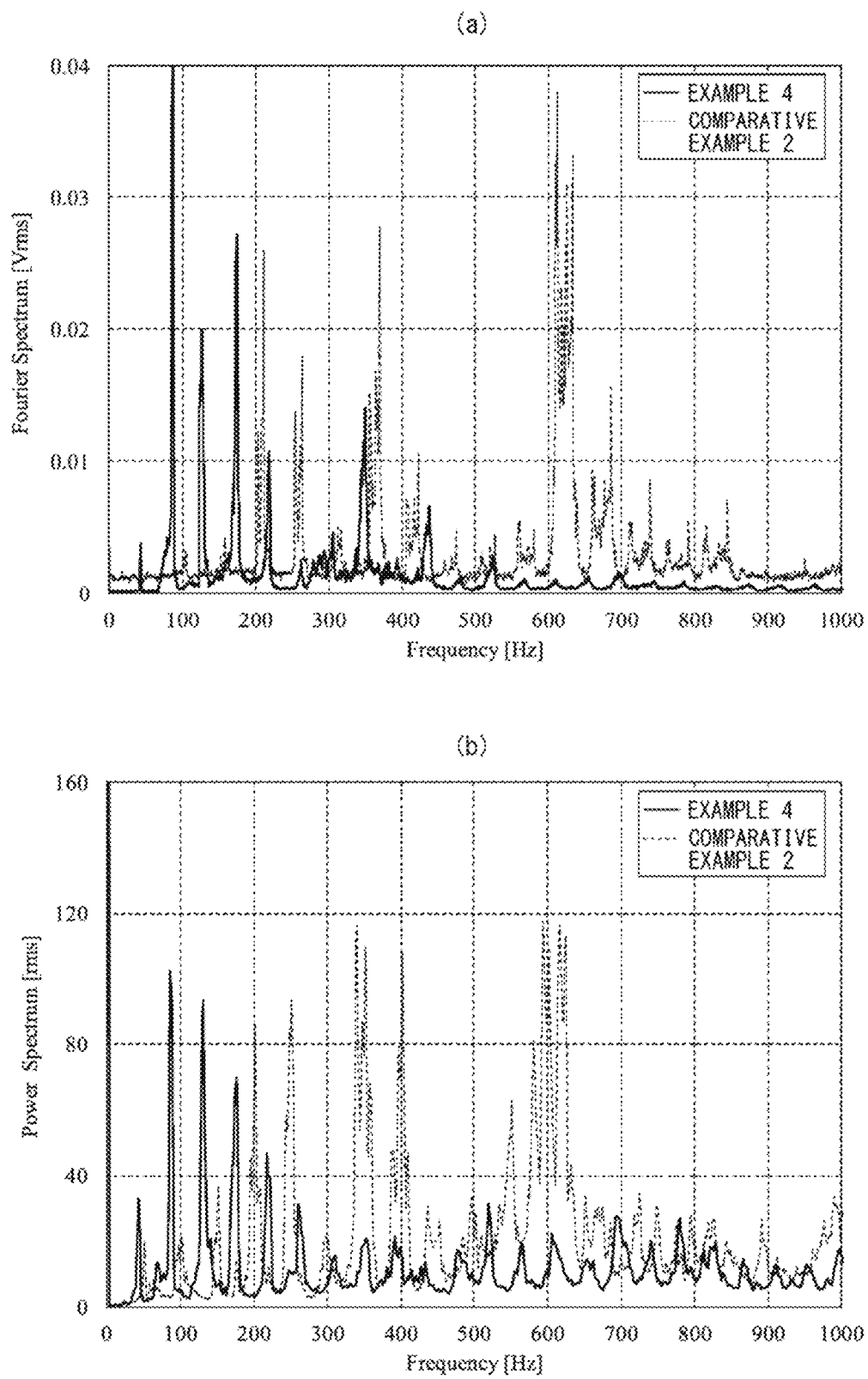
FIG. 21(a) is a diagram showing the frequency analysis result of vibration during a backward movement in Experiment Example 2.
FIG. 21(b) is a diagram showing the frequency analysis result of noise during a backward movement in Experiment Example 2.

FIG. 21(a) is a diagram showing frequency analysis results of vibration during a backward movement. FIG. 21(a) indicates that both Example 4 and Comparative Example 2 exhibited the peak of the primary frequency spectrum around 50 Hz and generated the secondary, tertiary, and higher-order components. However, for Comparative Example 4, various types ox irregular vibration were superimposed on the fundamental frequency. In particular, the vibration and disturbance were increased between 500 to 900 Hz. The reason seems that this vibration was caused by the whirling of long flexible shafts and then propagated to the air through a center plate supporting the long flexible shafts, resulting in unusual sounds. For Example 4, many harmonics were seen, but the vibration associated with the whirling movement seen in Comparative Example 2 was reduced. The reason seems that the use of a rotating shaft 232 which is a hollow pipe having high rotational energy reduced the radial-direct ion movement and thus reduced the whirling movement. As a result, rattle noise in gear mechanisms 210 was also reduced.

Figure 22:
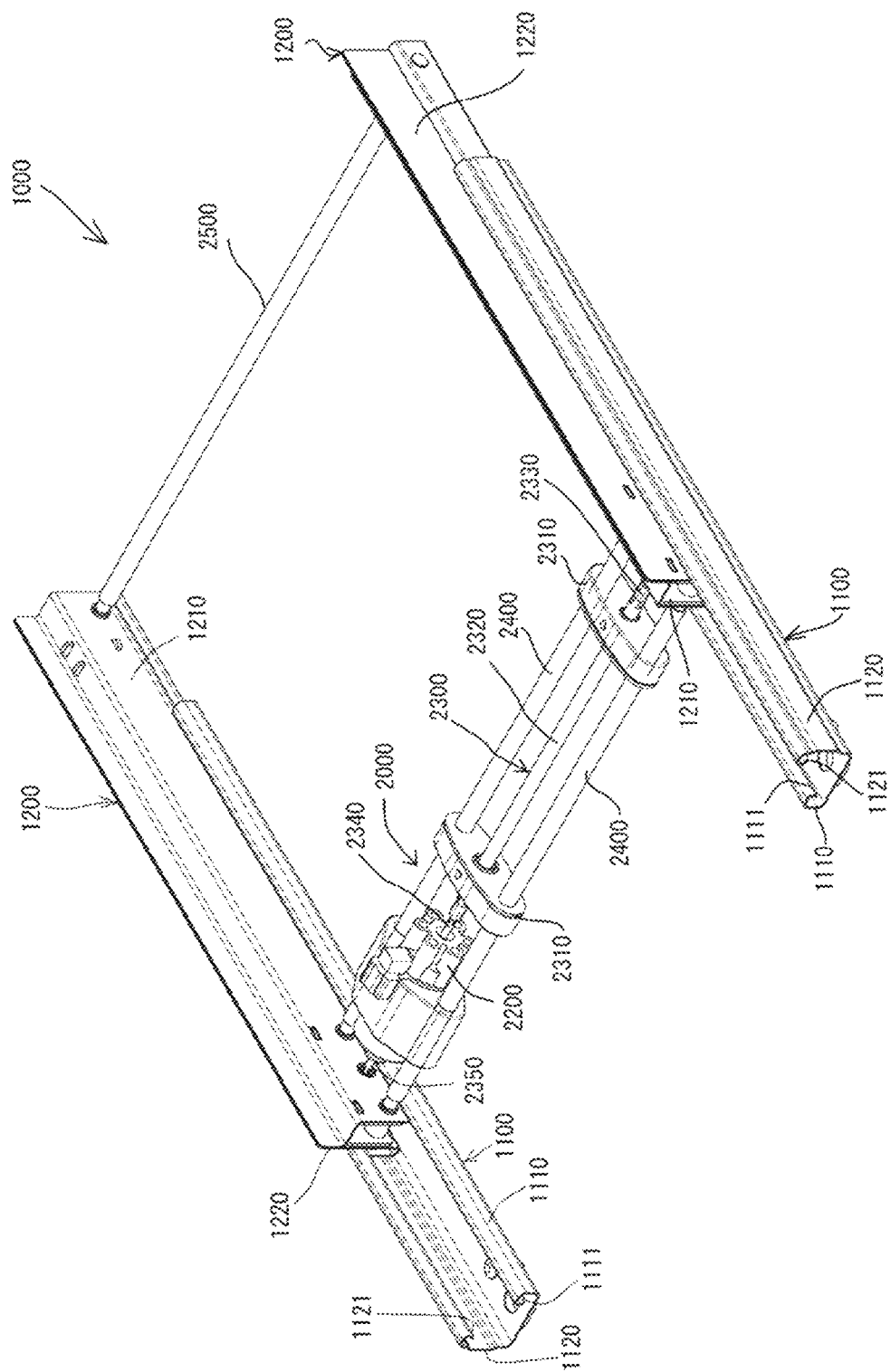
FIG. 22 is a perspective view showing a power seat sliding device of a fifth embodiment of the present invention seen from the front.
Figure 23:
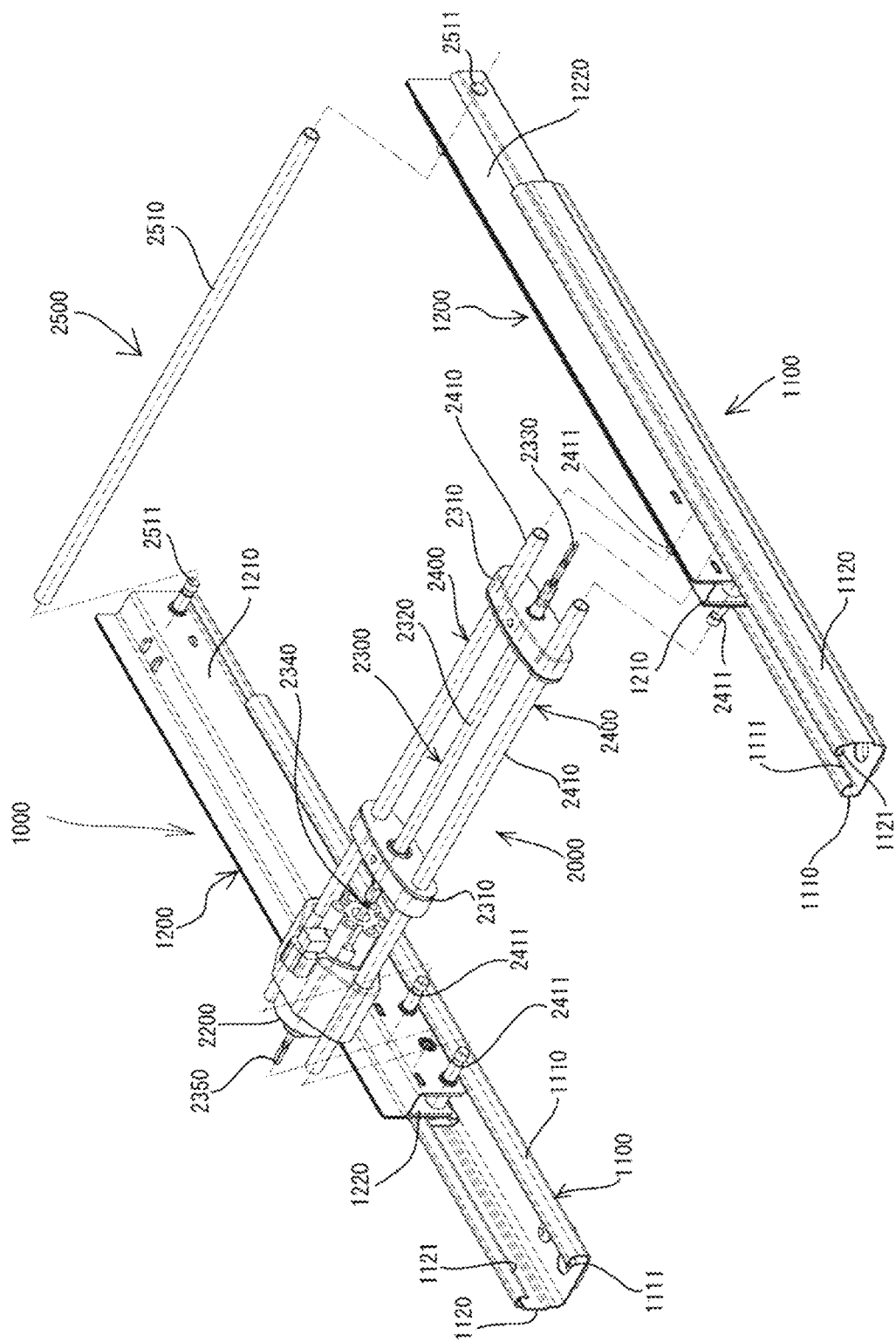
FIG. 23 is a perspective view showing a state in which a drive unit and a rotating mechanism are removed from sliders in the power seat sliding device in FIG. 22.

FIG. 22(b) is a diagram showing frequency analysis results of noise during a backward movement. A comparison between FIG. 21(a) and FIG. 21(b) reveals that there is a correlation between the vibration and noise frequency analysis results and that noise can be determined on the basis of the presence or absence of irregular vibration. The reason why although Example 4 also caused noise or vibration in a low frequency range, it obtained a good sensory evaluation seems that the vibration thereof had a low sound pressure and was difficult to hear.

In the above embodiments, the slide screws 11*a*, 11*a* are connected to the lower rails 11, 11, and the worm wheels 213, 213 serving also as nut members are connected to the upper rails 12, 12 through the cover members 211, 211 of the gear mechanisms 210, 210. However, the present invention can be, of course, applied to a type of power seat sliding device where slide screws are connected to upper rails; nut members are connected to lower rails so that gear mechanisms 210, 210 are supported by the upper rails; and the slide screws are displaced so that the upper rails move back and forth. FIGS. 22 to 26 and FIGS. 27 to 31 show embodiments of such a type of power seat sliding device.

A power seat sliding device 1000 of a fifth embodiment shown in FIGS. 22 to 26 uses upper rails 1200, 1200 in which inner plate 1210 and an outer plate 1220 face each other at a predetermined distance and which each have an approximately U-shaped section. The inner plate 1210 and outer plate 1220 have, as lower portions thereof, approximately U-shaped, lower-edge outward folds 1211, 1221 that are bent in directions opposite to directions in which the folds come close to the opposite outer plate 1220 or inner plate 1210.

Figure 26:
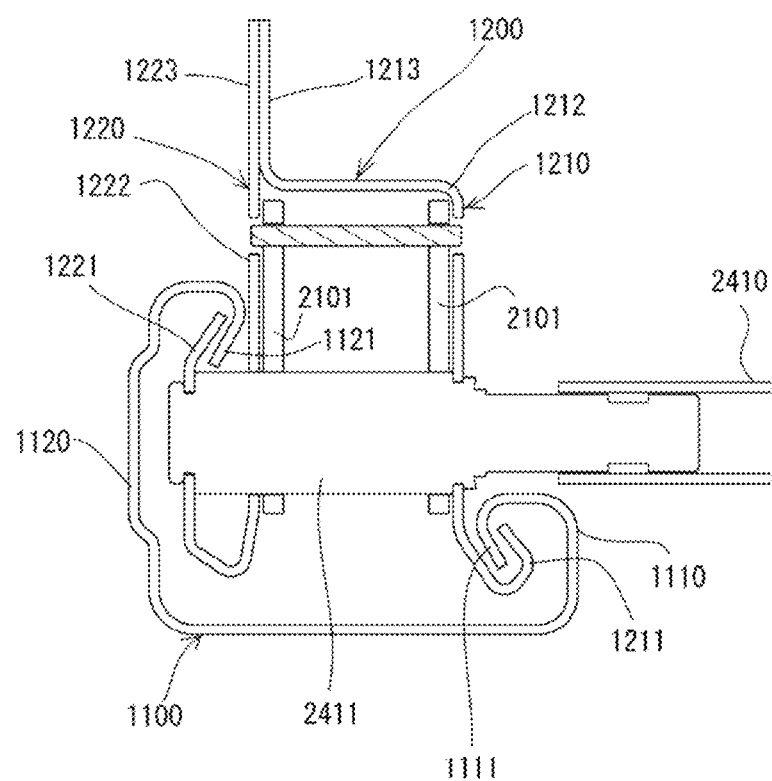
FIG. 26 is a line A-A sectional view of FIG. 25.
Figure 27:
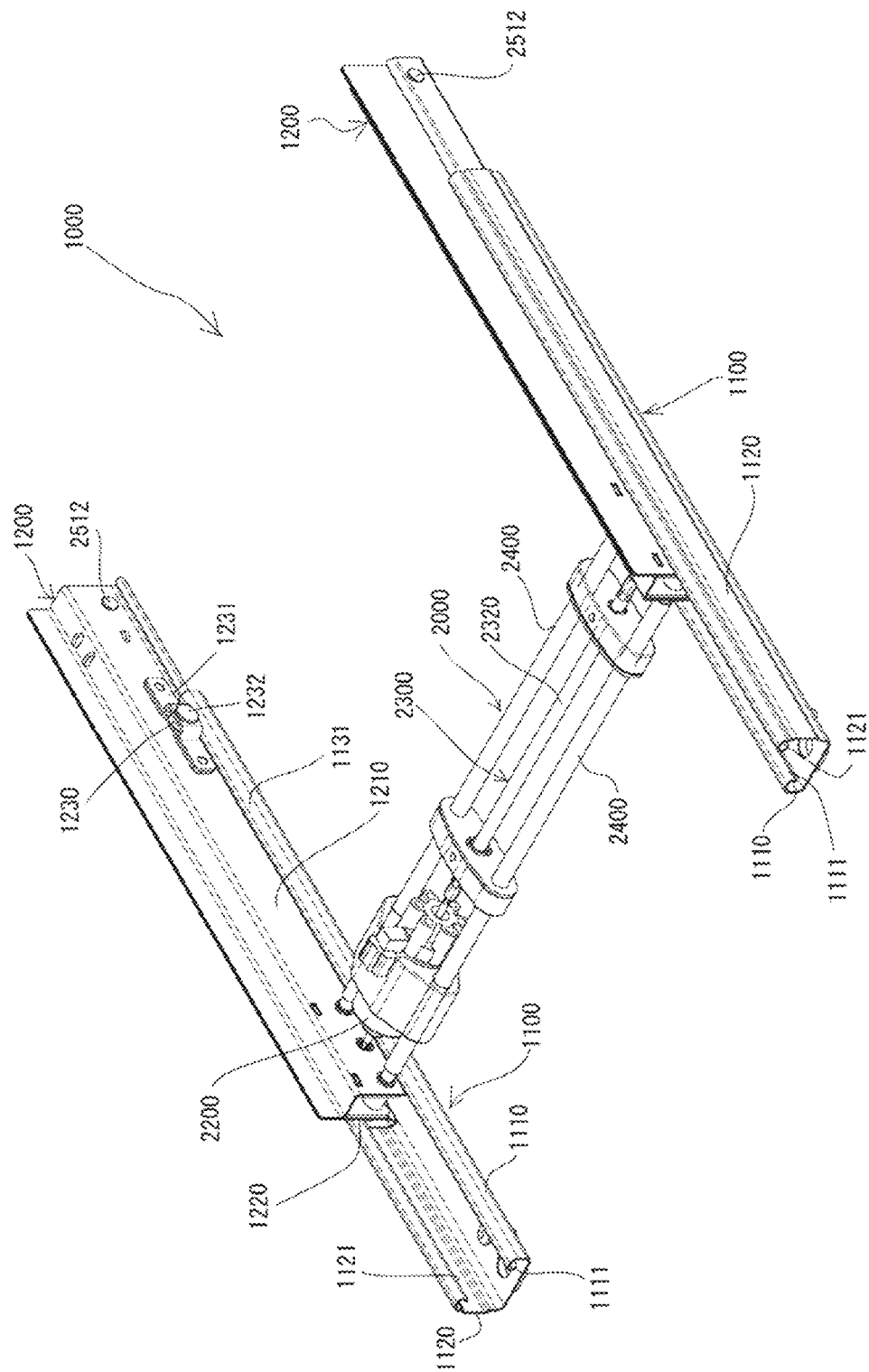
FIG. 27 is a perspective view showing a power seat sliding device of a sixth embodiment of the present invention seen from the front.
Figure 28:
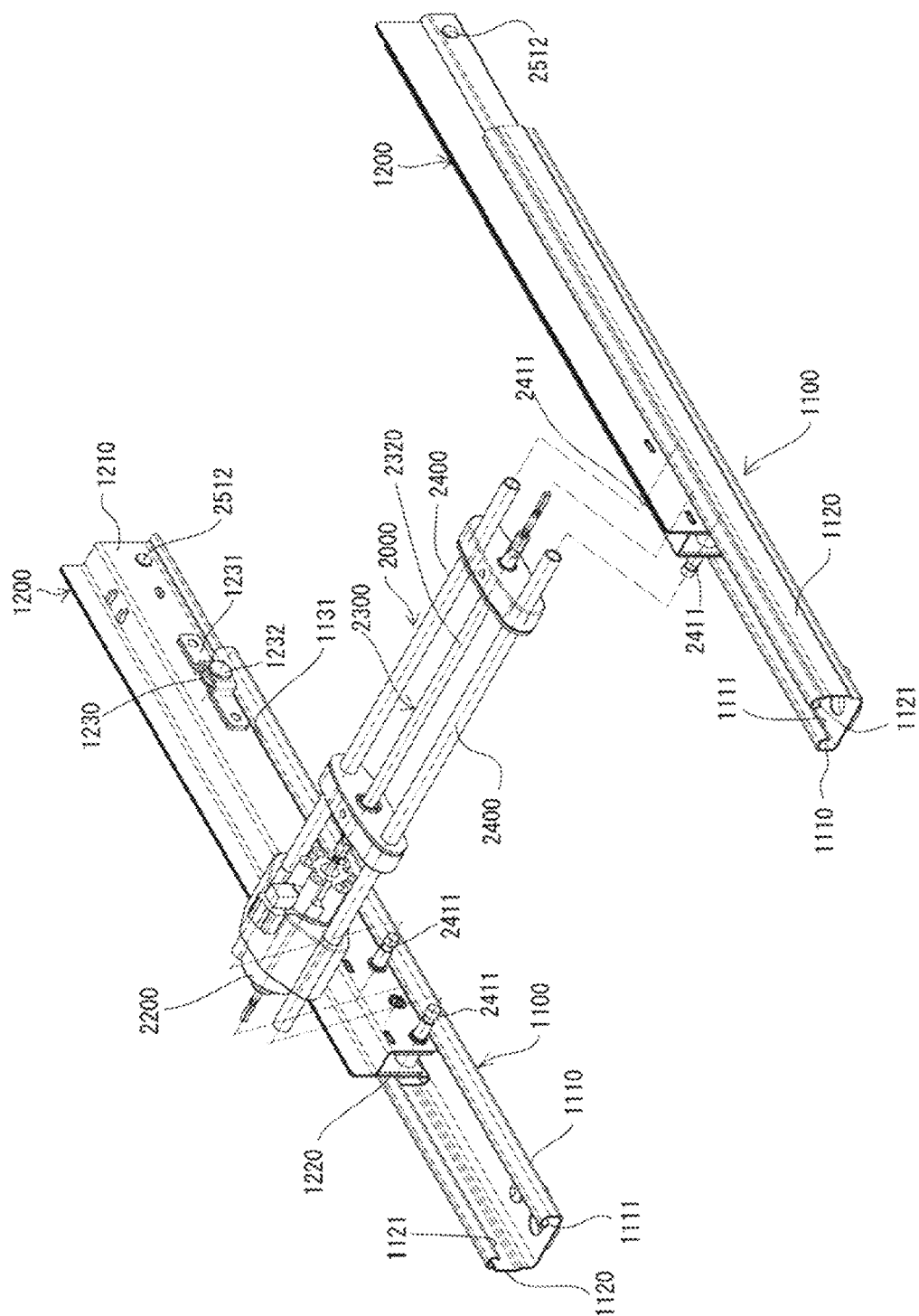
FIG. 28 is a perspective view showing a state in which a drive unit aid a rotating mechanism are removed from sliders in the power seat sliding device in FIG. 27.
Figure 32:
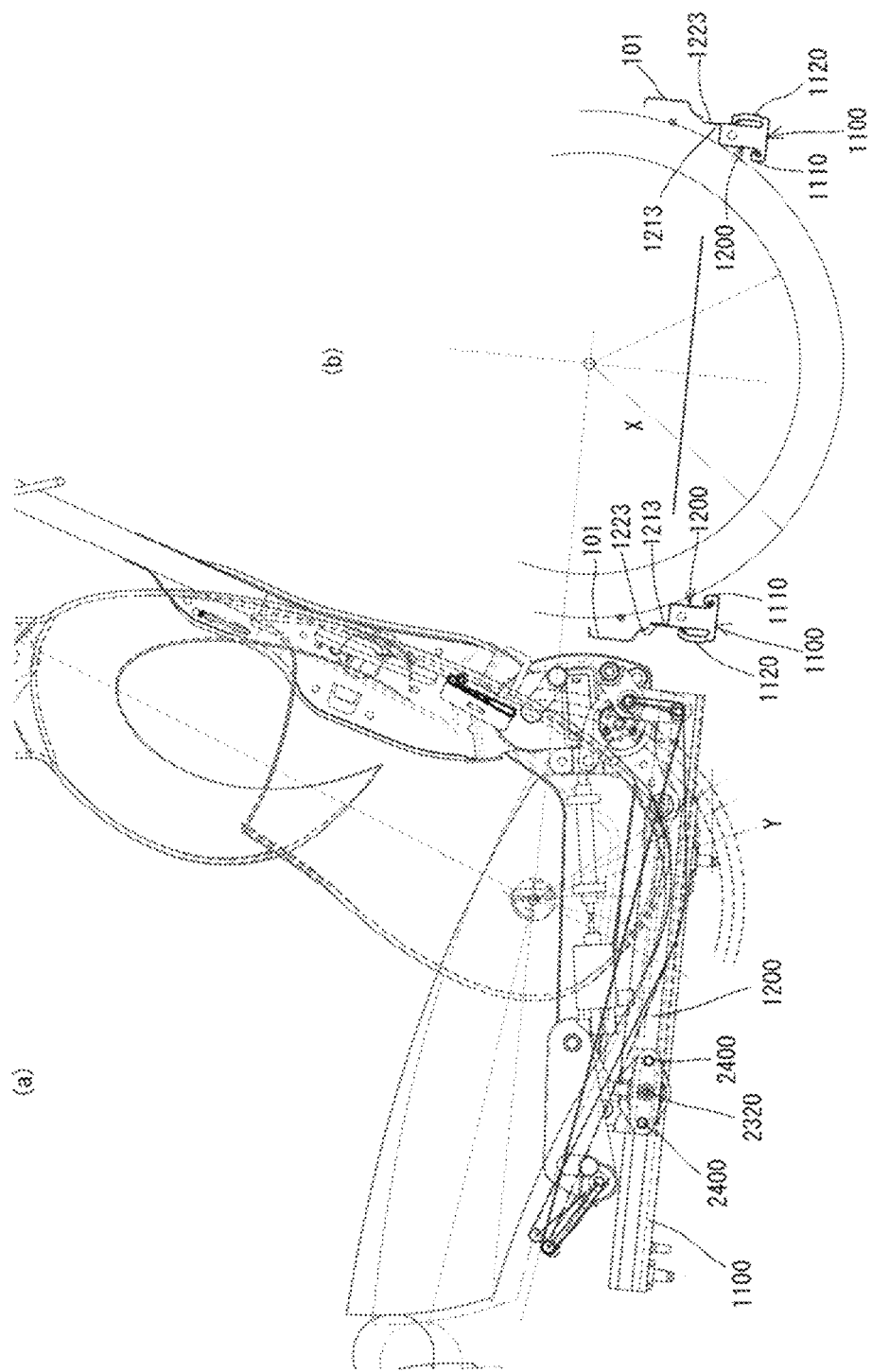
FIG. 32 (b) is a drawing showing an example of a design specification in which there is no portion in contact with a human in the width direction.

Specifically, as shown in FIG. 26, the inner plates 1210, 1210 located inside the upper rails 1200, 1200 consist of the lower-edge outward folds 1211, 1211, approximately L-shaped section plates 1212, 1212, which are portions of the inner plates 1210, 1210 except for the lower-edge outward folds 1221, 1221, and upper folds 1213, 1213 obtained by upwardly folding the outer edges of the side walls of the plates 1212, 1212. The outer plates 1220, 1220 located outside the upper rails 1200, 1200 consist of the lower-edge outward folds 1221, 1221 and vertical walls 1222, 1222 that extend approximately vertically. The inner plates 1210, 1210 and outer plates 1220, 1220 are combined together by overlaying the upper folds 1213, 1213 of the inner plates 1210, 1210 on upper protrusions 1223, 1223 of the vertical walls 1222, 1222. This makes cross-sections of the upper rails 1200, 1200 approximately U-shaped, as described above. The upper protrusions 1223, 1223 of the outer plates 1220, 1220 and the upper folds 1213, 1213 of the inner plates 1201, 1210 overlaid thereon form outside portions of the upper rails 1200, 1200. As shown in FIG. 32(*b*), side frames 101, 101 of a cushion frame 100 of a seat cushion are mounted on the upper protrusions 1223, 1223 and upper folds 1213, 1213 forming outside portions of the upper rails 1200, 1200. Thus, long distances can be obtained as the distances from the hip point to the side frames 101, 101 and the inner plates 1210, 1210 of the upper rails 1200, 1200. This configuration facilitates the satisfaction of a design condition that a portion that may contact a human shall not be provided within a predetermined radius X from the hip point. Details will be discussed later.

On the other hand, lower rails 1100, 1100 are formed so as to have approximately L-shaped sections and include inner walls 1110, 1110 and outer walls 1120, 1120 that face each other at a predetermined distance. The inner walls 1110, 1110 are formed so as to have lower heights than the outer walls 1120, 1120. The inner walls 1110, 1110 and outer walls 1120, 1120 have upper-edge inward folds 1111, 1121 having approximately inverted U-shaped sections obtained by folding upper portions thereof inwardly, then downward, and then toward the inner surfaces of the outer walls 1120, 1120 and inner walls 1110, 1110. The pair of opposed inner plate 1210 and outer plate 1220 of each upper rail 1200 are disposed between the upper-edge inward fold 1111 of the inner wall 1110 and the upper-edge inward fold 1121 of the outer wall 1120. Specifically, the pair of opposed inner plate 1210 and outer plate 1220 of each upper rail 1200 are disposed in such a manner that the lower-edge outward folds 1211, 1221 of the inner plate 1210 and outer plate 1220 of the upper rail 1200 correspond to the upper-edge inward folds 1111, 1121, respectively. More specifically, the pair of opposed inner plate 1210 and outer plate 1220 of each upper rail 1200 are disposed in such a manner that parts of the inner circumferential surfaces of the upper-edge inward folds 1111, 1121 having approximately inverted U-shaped sections face parts of the inner circumferential surfaces of the lower-edge outward folds 1211, 1221 having approximately U-shaped sections. Thus, the upper rails 1200, 1200 are guided along the length direction of the lower rails 1100, 1100.

As in the above embodiments, a driving force transmission mechanism 2000 including a pair of left and right gear mechanisms 2100, 2100, a drive unit 2200, and a rotating mechanism 2300 is disposed between the pair of left and right upper rails 1200, 1200. The rotating mechanism 2300 includes a pair of bearings 2310, 2310 disposed at a predetermined distance and a rotating shaft 2320 extending between the pair of bearings 2310, 2310. Two reinforcing frames 2400, 2400 extend with the rotating shaft 2320 therebetween. Such a configuration is also similar to those or the embodiments.

Note that the configuration of the reinforcing frames 2400, 2400 differs from those of the embodiments. Specifically, the reinforcing frames 2400, 2400 of the present embodiment include pipe frames 2410, 2410 and solid end shafts 2411, 2411 connected to the ends of the pipe frames 2410, 2410 by swaging or the like. The end shafts 2411, 2411 are disposed so as to penetrate through the opposed inner plate 1210 and outer plate 1220 of the upper rails 1200, 1200 and to extend between the inner plate 1210 and outer plate 1220. As shown in FIG. 26, in the present embodiment, the formation position of the upper-edge inward fold 1121 of the outer wall 1120 of each lower rail 1100, 1100 is higher than the formation position of the upper-edge inward fold 1111 of the inner wall 1110. Accordingly, the lower-edge outward fold 1211 of the side plate 1210 disposed outside has a large area, that is, the lower-edge outward fold 1211 and the outer plate 1220 have a large overlapping area in a side view. For this reason, the end shafts 2411, 2411 are disposed so as to penetrate also through the lower-edge outward fold 1221 of the outer plate 1220. The disposition of the end shafts 2411, 2411 in this manner suppresses deformation such that the distance between the inner plate 1210 and outer plate 1220 is increased by a large load received from a belt anchor or the like. Such disposition also increases the effect of suppressing the departure of the upper rails 1200, 1200 from the lower rails 1100, 1100.

Gear mechanisms 2100, 2100 are disposed on extensions of the centers of flexible shafts 2330, 2340, 2350 located between the pair of reinforcing frames 2400, 2400 and connected to the rotating shaft 2320 and drive unit 2200. Accordingly, the gear mechanisms 2100, 2100 are disposed between the end shafts 2411, 2411 adjacent to each other back and forth in the upper rails 1200, 1200. In the present embodiment, tabular gear-mechanism brackets 2101, 2101 formed of steel are mounted between the end shafts 2411, 2411 so as to be adjacent to the inner plates 1210, 1210 and to be overlaid on the opposite surfaces of the inner plates 1210, 1210 (see FIG. 26).

Figure 24:
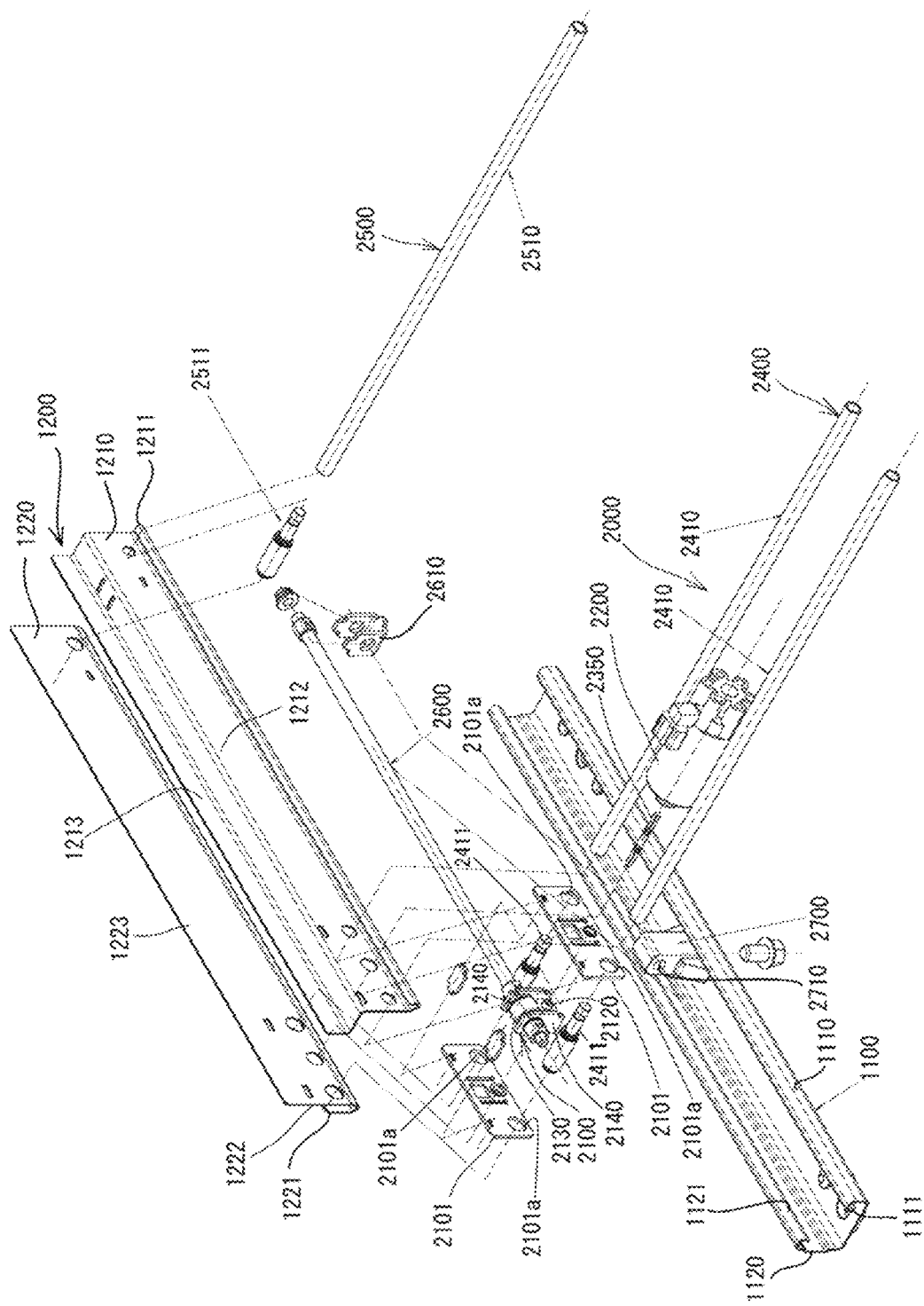
FIG. 24 is an exploded perspective view showing the structures of the drive unit and rotating mechanism in the power seat sliding device in FIG. 22.
Figure 25:
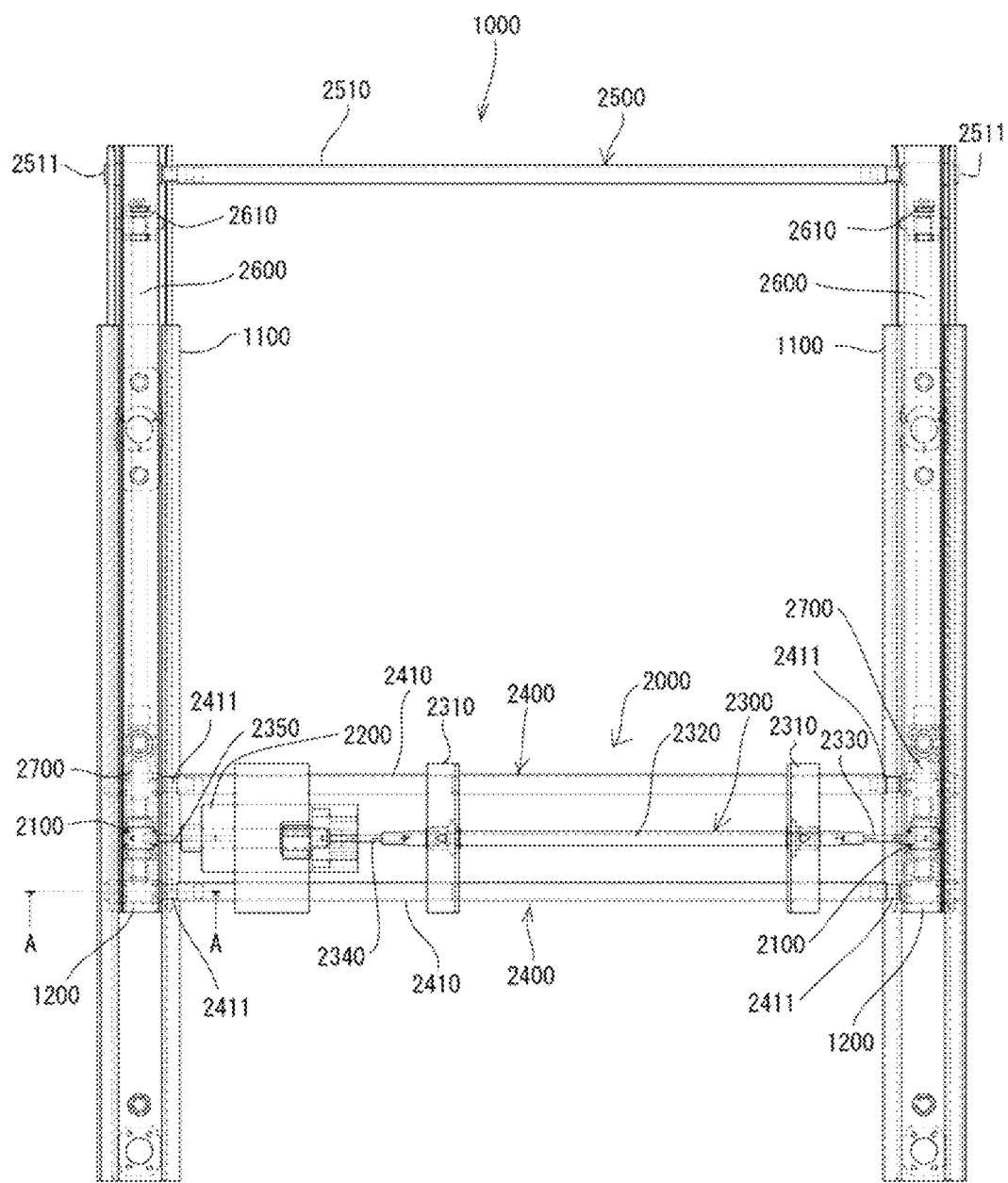
FIG. 25 is a plan view of the power seat sliding device in FIG. 22.

As shown in FIG. 24, the gear-mechanism brackets 2101, 2101 have a predetermined length in the length direction of the upper rails 1200, 1200. The gear-mechanism brackets 2101, 2101 have insertion holes 2101*a*, 2101*a* for the end shafts 2411, 2411 near both ends thereof so that the end shafts 2411, 2411 are inserted in and supported by the insertion holes 2101*a*, 2101*a*. Thus, when a large load is inputted to the gear mechanisms 2100, 2100, the end shafts 2411, 2411 can receive the large lead through the gear-mechanism brackets 2101, 2101. This configuration can help improve the strength or rigidity of the power seat sliding device 1000.

The gear mechanisms 2100, 2100 include worms 2120, 2120 having a first flexible shaft 2330 and a third flexible shaft 2350 connected thereto and worm wheels 2130, 2130 disposed over the worms 2120, 2120 so as to be engaged with the worms 2120, 2120. The sets of worm 2120 and warm wheel 2130 are held by holding brackets 2140, 2140. The holding brackets 2140, 2140 are disposed so as to be supported by the gear-mechanism brackets 2101, 2101.

The worm wheels 2130, 2130 are held by the holding brackets 2140, 2140 so as to be rotatable by the rotation of the worms 2120, 2120. Slide screws 2600, 2600 are connected to the worm wheels 2130, 2130 so as to rotate with the worm wheels 2130, 2130.

The slide screws 2600, 2600 are disposed along the length direction of the upper rails 1200, 1200. One ends of the slide screws 2600, 2600 are connected to the worm wheels 2130, 2130 as described above, and the other ends are rotatably supported by end holding members 2610, 2610 which are disposed so as to be close to rear portions of the side plates 1210, 1210 of the upper rails 1200, 1200.

Nut members 2700, 2700 are disposed midway in the length direction of the lower rails 1100, 1100 between the inner walls 1110, 1110 and outer walls 1120, 1120. The nut members 2700, 2700 have female screw parts 2710, 2710 screwed to the slide screws 2600, 2600 and formed so as to penetrate through upper portions of the nut members 2700, 2700.

The pair of left and right gear mechanisms 2100, 2100, drive unit 2200, rotating mechanism 2300, and two reinforcing frames 2400, 2400 forming the driving force transmission mechanism 2000 are disposed close to front portions of the upper rails 1200, 1200. The one ends of the slide screws 2600, 2600 connected so the worm wheels 2130, 2130 are located close to the front portions of the upper rails 1200, 1200, and the other ends are rotatably supported by the end holding members 2610, 2610 close to rear portions of the upper rails 1200, 1200, as described above. The front portions of the upper rails 1200, 1200 are connected by the reinforcing frames 2400, 2400. Preferably, rear portions thereof are also connected by a rear reinforcing frame 2500. The rear reinforcing frame 2500 includes end shafts 2511, 2511 penetrating through the side plates 1210, 1210 of the left and right upper rails 1200, 1200 and a pipe frame 2510 extending between the left and right end shafts 2511, 2511. The left and right upper rails 1200, 1200, the reinforcing frames 2400, 2400 close to the front portions thereof, and the rear reinforcing frame 2500 close to the rear portions thereof form a rectangular frame that can help improve the strength or rigidity of the power seat sliding device 1000. Thus, the loss of the balance of the rectangular frame is suppressed during the operation of the upper rails 1200, 1200, and the misalignment between the flexible shafts 2330, 2340, 2350 is reduced. As a result, the operating noise can be reduced.

According to the present embodiment, the driving of the drive unit 2200 rotates the worms 2120, 2120 of the gear mechanism 2100, 2100 through the rotating shaft 2320 and flexible shafts 2330, 2340, 2350. The rotation of the worms 2120, 2120 rotates the worm wheels 2130, 2130, which then rotate the slide screws 2600, 2600 connected to the worm wheels 2130, 2130. The rotation of the slide screws 2600, 2600 causes themselves to move back and forth, since the nut members 2700, 2700 are fixed to the lower rails 1100, 1100. Thus, the upper rails 1200, 1200 move back and forth.

Since the structure of the present embodiment also includes the rotating shaft 2320 and the short flexible shafts 2330, 2340, 2350, there can be obtained the same unusual sound reduction effect as those of the structures of the above embodiments where the slide screws 11*a*, 11*a* are connected to the lower rails 11, 11.

As described above, in the present embodiment, the lower rails 1100, 1100 have approximately L-shaped sections such that the heights of the inner walls 1110, 1110 are lower than those of the outer walls 1120, 1120. Accordingly, the heights of the upper-edge inward folds 1111, 1111 of the inner walls 1110, 1110 are lower than the heights of the upper-edge inward folds 1121, 1221 of the outer walls 1120, 1120. With respect to the heights of the lower-edge outward folds 1211, 1221 of each upper rail 1200 facing them, what is located inside is lower than what is located outside (see FIG. 26).

Since the lower rails 1100, 1100 and upper rails 1200, 1200 have the above configuration, the heights of upper walls 1131, 1131 located at the top of the upper-edge inward folds 1111, 1111 of the inner walls 1110, 1110 of the lower rails 1100, 1100 are lower than those of the upper walls of the outer walls 1120, 1120. This configuration facilitates the satisfaction of the design condition that a portion that may contact a human shall not be provided within the predetermined radius X around the hip point shown in FIG. 32(*b*).

As described above, the side frames 101, 101 of the cushion frame 100 are mounted on the upper protrusions 1223, 1223 and upper folds 1213, 1213 located outside the upper rails 1200, 1200. Thus, a longer distance can be obtained as the distance from the hip point to the side frames 101, 101 or to the inner plates 1210, 1210 of the upper rails 1200, 1200. This configuration also facilitates the satisfaction of the design condition that a portion that may contact a human shall not be provided within the predetermined radium X from the hip point.

Further, the lower rails 1100, 1100 have approximately L-shaped sections, and the heights of the inner walls 1110, 1110 are lower than the heights of the outer walls 1120, 1120. For this reason, the joints of the worms 2120 of the pair of left and right gear mechanisms 2100, 2100 and the first and third flexible shafts 2330, 2350 are only required to be located slightly above the upper walls 1131, 1131 of the inner walls 1110, 1110 so as not to interfere with the upper walls 1131, 1131. Thus, the joints are located in lower positions than the heights of the upper positions of the outer walls 1120, 1120. Also, the heights of the centers of the rotating shaft 2320 located between the pair of gear mechanisms 2100, 2100 and aligned with the first and third flexible shafts 2330, 2350, the second flexible shaft 2340, and the two reinforcing frames 2400 disposed so as to sandwich the rotating shaft 2320 are lower than those of the structure in which the heights of the lower rails 1100, 1100 and outer walls 1120, 1120 of the inner walls 1110, 1110 are set at the same height (a structure as seen in the embodiment in FIG. 1). That is, these heights are lower than the heights of the outer walls 1120, 1120. Since the rotating shaft 2320, the two reinforcing frames 2400, and the like are disposed at lower heights. This configuration facilities the satisfaction of a design condition that a portion that may contact a human shall not be provided within a predetermined radium Y in the front-back direction around the hip point.

As a result, it is possible to lower the position of the hip point of the seat; cushion including the cushion frame 100 supported by the upper rails 1200, 1200. Also, according to the present embodiment, the two reinforcing frames 2400, 2400 are disposed in positions which are low and close to the front portions of the upper rails 1200, 1200. Thus, it is possible to achieve a seat cushion structure which allows for a low-hip-point sitting posture. Further, the reinforcing frames 2400, 2400 helps suppress a so-called "submarine phenomenon," in which a seated person sinks down when receiving a predetermined or higher degree of shock.

FIGS. 27 to 31 show a power seat sliding device 1000 of a sixth embodiment. While the power seat sliding device 1000 of the sixth embodiment has an approximately similar configuration to that of the power seat sliding device 1000 of the fifth embodiment, it includes rollers 1230, 1230 that are disposed close to rear portions of upper rails 1200, 1200, protrude toward the inside of the upper rails 1200, 1200, and serve as upper-wall moving objects. The rollers 1230, 1230 are rotatably supported by mounting brackets 1231, 1231 mounted on inner plates 1210, 1210 of the upper rails 1200, 1200 with shaft members 1232, 1232 therebetween [see FIGS. 29 and 31(*a*)].

Figure 29:
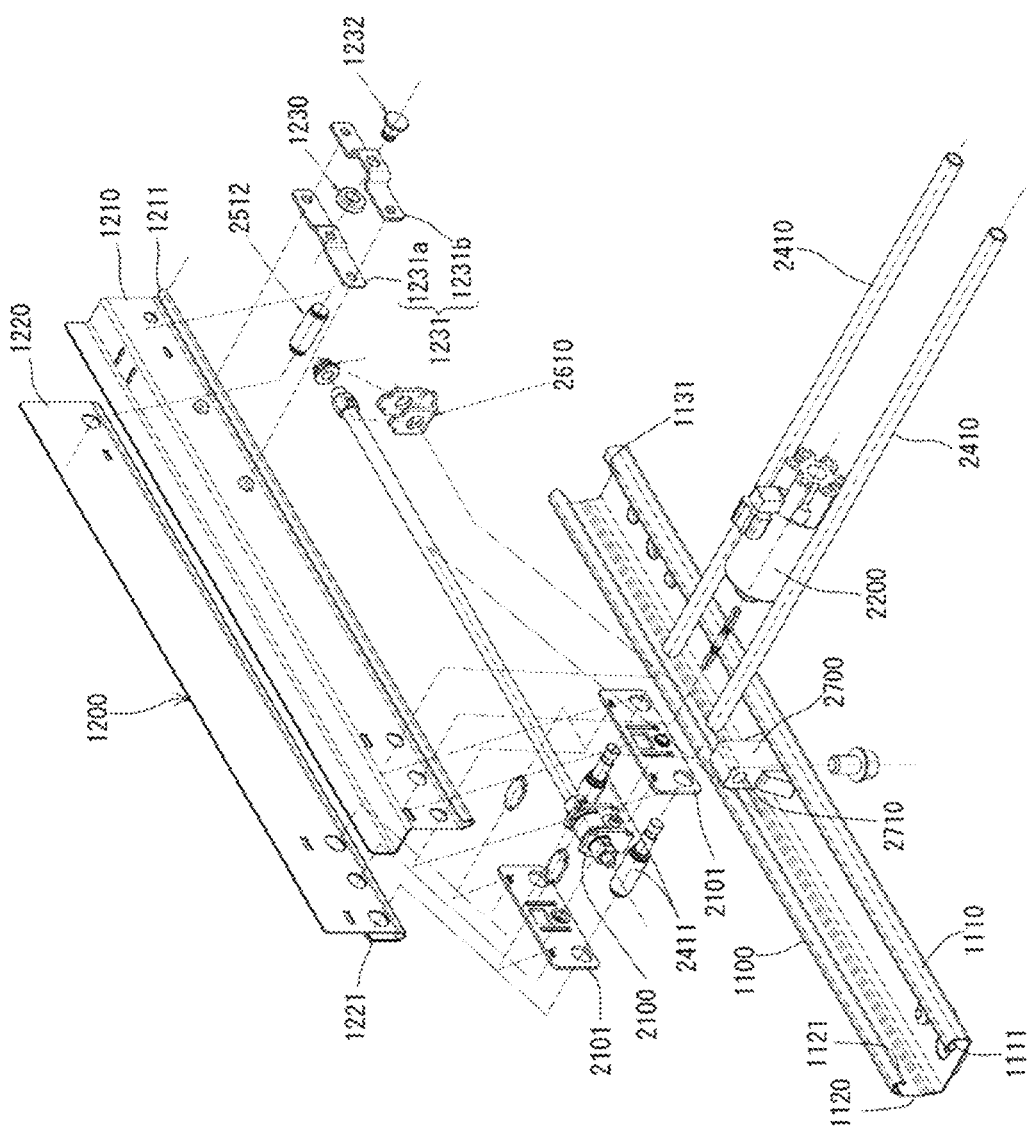
FIG. 29 is an exploded perspective view showing the structures of the drive unit and rotating mechanism in the power seat sliding device in FIG. 27.
Figure 30:
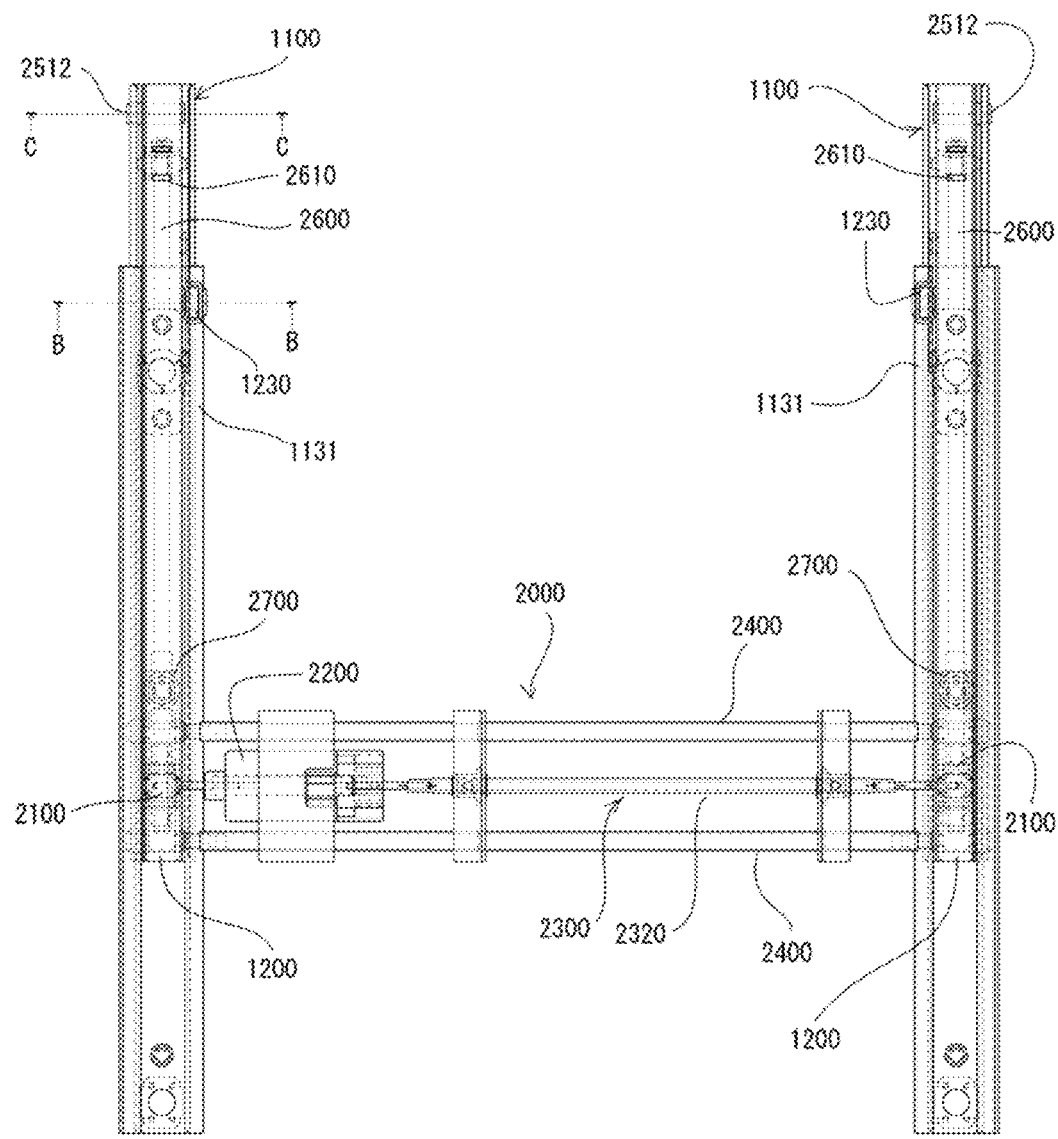
FIG. 30 is a plan view of the power seat sliding device in FIG. 27.
Figure 31:
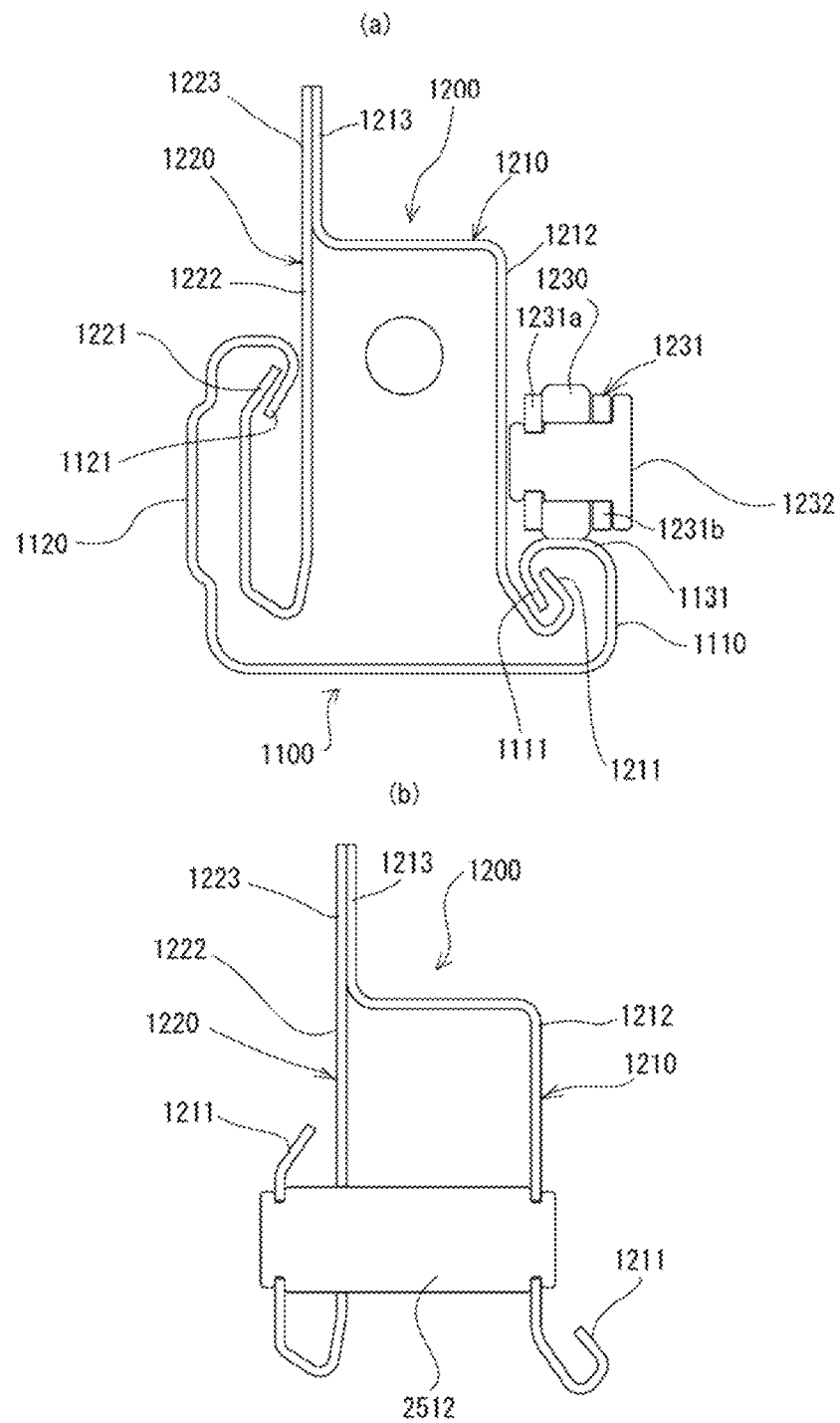
FIG. 31(a) is a line B-B sectional view of FIG. 27.
FIG. 31(b) is a line C-C sectional view of FIG. 27.

The rollers 1230, 1230 roll along upper walls 1131, 1131 located at the top of approximately inverted U-shaped, upper-edge inward folds 1111, 1111 of inner walls 1110, 1110 of lower rails 1100, 1100 [see FIG. 31(*a*)]. Thus, even if the left and right upper rails 1200, 1200 are likely to fall inward when receiving a large load, the deformation thereof is suppressed, since the rollers 1230, 1230 are in contact with the upper walls 1131, 1131. As shown in FIG. 29, the mounting brackets 1231, 1231 preferably support the rollers 1230 from both sides as follows: each mounting bracket 1231 consists of two brackets 1231*a*, 1231*b*; the roller 1230 is disposed therebetween; and the shaft member 1232 penetrates through the two brackets 1231*a*, 1231*b*. Such a structure improves the strength against deformation when receiving a large load.

The present embodiment also may form a rectangular frame by extending the pipe frame 2310 of the rear reinforcing frame 2500 used in the fifth embodiment between rear portions of the upper rails 1200, 1200. However, in the case of a low-hip-point seat cushion structure, the disposition of the rear reinforcing frame 2500 may run counter to the design specification requiring the elimination of a contact portion within the predetermined radius Y as shown in FIG. 32(*a*), and the rear reinforcing frame 2500 is difficult to dispose. In this case, the rollers 1230, 1230, which are upper-wall moving objects, serve as an alternative to the rear reinforcing frame 2500. Note that even if the pipe frame 2510 of the rear reinforcing frame 2500 is not disposed, it is preferred to dispose, in rear portions of the upper rails 1200, 1200, reinforcing connection shafts 2512, 2512 that penetrate through the inner plate 1210 and outer plate 1220 and connect them in terms of improvements in strength or rigidity [see FIG. 31(*b*)].

DESCRIPTION OF REFERENCE SIGNS

1, 1', 1", 1000 power seat sliding device
10 slider
11, 1100 lower rail
11*a* slide screw
12, 1200 upper rail
20, 2000 driving force transmission mechanism
210, 2100 gear mechanism
211 cover member
212, 2120 worm
213, 2130 worm wheel
220, 2200 drive unit
225 elastic member
230, 230', 2300 rotating mechanist
231 bearing
232, 2320 rotating shaft
233, 2330 first flexible shaft
234, 2340 second flexible shaft
235, 2350 third flexible shaft
236 auxiliary drive unit
237 elastic member
238 fourth flexible shaft
240, 2400 reinforcing frame

The invention claimed is:

1. A power seat sliding device comprising:
a pair of left and right sliders including upper rails and lower rails, the upper rails being movably disposed on the lower rails and configured to support a seat;
a pair of left and right slide screws disposed along moving directions of the upper rails;
nut members screwed to the slide screws; and
a driving force transmission mechanism configured to cause one, connected to the upper rails, of the slide screws and the nut members to rotate relative to the other, connected to the lower rails, of the slide screws and the nut members, the driving force transmission mechanism including:
a pair of left and right gear mechanisms disposed on the upper rails or the lower rails and configured to transmit a rotation force that causes the slide screws and the nut members to rotate relatively;
a drive unit disposed between the pair of left and right gear mechanisms and consisting of a motor that is configured to generate a rotation force in operation;
a rotating mechanism disposed between the drive unit and a first one of the pair of left and right gear mechanisms so as to be connected to an output shaft of the drive unit, the rotating mechanism having a function of compensating for an energy loss of the rotation force of the drive unit;
a first flexible shaft connecting between the drive unit and the rotating mechanism;
a second flexible shaft connecting between the rotating mechanism and the first one of the pair of left and right gear mechanisms; and
a third flexible shaft connecting between the drive unit and a second one of the pair of left and right gear mechanisms; wherein
the first, second, and third flexible shafts are configured to rotate by smaller kinetic energy than any of kinetic energy of the drive unit, kinetic energy of the rotating mechanism in motion, and friction forces and damping forces of rotating parts of the pair of left and right gear mechanisms; and
the rotating mechanism includes:
a pair of bearings spaced apart at a predetermined distance between the drive unit and the first one of the pair of left and right gear mechanisms; and
a rotating shaft extending between the pair of bearings and connected to the output shaft of the drive unit,
the first flexible shaft is disposed so as to connect between the drive unit and the rotating shaft, and
the second flexible shaft is disposed so as to connect between the rotating shaft and the first one of the pair of left and right gear mechanisms.

2. The power seat sliding device of claim 1, wherein the first, second, and third flexible shafts are connected to the drive unit, the rotating mechanism, and the rotating parts of the pair of the left and right gear mechanisms so as to be movable in a thrust direction.

3. The power seat sliding device of claim 1, wherein the rotating shaft has a mass heavier than masses of gears connected to the first, second, and third flexible shafts and included in the pair of the left and right gear mechanisms.

4. The seat slide device of claim 1, wherein
the rotating mechanism further includes an auxiliary drive unit consisting of a motor, and
the rotating shaft is connected to an output shaft of the auxiliary drive unit.

5. The power seat sliding device of claim 1, wherein the pair of bearings are formed of elastic members.

6. The seat sliding device of claim 5, wherein
a difference is made between degrees to which the rotating shaft is press-fitted to bearing holes of the pair of bearings or a difference is made between clearances between the bearing holes and the rotating shaft, and
the bearing holes are configured to cause the rotating shaft to make a whirling movement around one of the bearing holes and are able to absorb whirling of the output shaft of the drive unit.

7. The power seat sliding device of claim 1, wherein
each of the pair of bearings has a central portion and outside portions sandwiching the central portion,
the central portion of each of the pair of bearings has a bearing hole for the rotating shaft,
the outside portions of each of the pair of bearings have outside penetration holes through which reinforcing frames penetrate, and
ends of each of the reinforcing frames are fixed to the upper rails.

8. The power seat sliding device of claim 7, wherein
the lower rails have approximately L-shaped sections such that heights of outer walls of the approximately L-shaped sections are greater than heights of inner walls of the approximately L-shaped sections, and centers of the rotating shaft and the reinforcing frames are disposed at lower positions than uppermost portions of the outer walls of the approximately L-shaped sections.

9. The power seat sliding device of claim 8, wherein
the driving force transmission mechanism is disposed close to front portions of the upper rails, and
a rear reinforcing frame extends between rear portions of the upper rails.

10. The power seat sliding device of claim 8, wherein
the driving force transmission mechanism is disposed close to front portions of the upper rails, and
upper-wall moving objects are disposed close to rear portions of the upper rails, the upper-wall moving objects each protruding inwardly with respect to the outer wall of a corresponding one of the lower rails and each being configured to move along an upper wall portion of the inner wall of the corresponding one of the lower rails and to suppress inward fall of a corresponding one of the upper rails.

11. The power seat sliding device of claim 7, wherein
the upper rails each have an inner plate and an outer plate facing the inner plate at a predetermined distance,
lower-edge outward folds of the inner and outer plates of each of the upper rails are formed so as to correspond to upper-edge inward folds of a corresponding one of the lower rails, and
ends of each of the reinforcing frames are fixed so as to penetrate through the inner and outer plates of each of the upper rails.

12. An apparatus comprising:
the power seat sliding device of claim 1; and
a vehicle seat comprising:
a seat cushion;
a seat back; and
the seat cushion is mounted on the upper rails of the power seat sliding device.

* * * * *